(12) United States Patent
Park et al.

(10) Patent No.: US 11,363,905 B2
(45) Date of Patent: Jun. 21, 2022

(54) ELECTRIC KETTLE

(71) Applicant: LG ELECTRONICS INC., Seoul (KR)

(72) Inventors: Jongwon Park, Seoul (KR); Jongok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 193 days.

(21) Appl. No.: 16/826,447

(22) Filed: Mar. 23, 2020

(65) Prior Publication Data

US 2020/0297149 A1 Sep. 24, 2020

(30) Foreign Application Priority Data

Mar. 21, 2019 (KR) .................. 10-2019-0032611

(51) Int. Cl.
*A47J 27/21* (2006.01)
*C25F 3/24* (2006.01)

(52) U.S. Cl.
CPC ..... *A47J 27/21166* (2013.01); *A47J 27/2105* (2013.01); *A47J 27/21066* (2013.01); *A47J 27/21091* (2013.01); *C25F 3/24* (2013.01)

(58) Field of Classification Search
CPC ................................ A47J 27/21166
See application file for complete search history.

(56) References Cited

U.S. PATENT DOCUMENTS

| 1,758,571 | A | * | 5/1930 | Hager | .............. | F24B 1/003 |
| | | | | | | 126/275 R |
| 2,152,924 | A | * | 4/1939 | Rutenber | ............ | A47J 36/36 |
| | | | | | | 126/275 R |
| 3,217,923 | A | | 11/1965 | Price | | |

(Continued)

FOREIGN PATENT DOCUMENTS

| AU | 2018-100380 | 5/2018 |
| CN | 201213711 | 4/2009 |

(Continued)

OTHER PUBLICATIONS

European Search Report dated Jul. 23, 2020 issued in EP Application No. 20164457.2.

(Continued)

*Primary Examiner* — Nathaniel Herzfeld
(74) *Attorney, Agent, or Firm* — Ked & Associates LLP

(57) ABSTRACT

An electric kettle may include a body made of stainless steel and having a cylindrical shape with an open upper surface and an open lower surface, a heating module configured to form a bottom of a space in which fluid, such as water is contained inside of the body and heat the fluid, a handle that protrudes from an upper portion of an outer surface of the body, and a base configured to support the body at a lower side and supply power to the heating module in a state in which the body is seated. The body may include an outer body configured to form the outer surface of the body, an inner body connected to the outer body inside of the outer body and configured to form a space in which fluid is (Continued)

contained, a heat insulation space between the outer body and the inner body, and at least one body hole opened in the lower surface of the body and configured to communicate with the heat insulation space.

23 Claims, 26 Drawing Sheets

(56) References Cited

U.S. PATENT DOCUMENTS

| | | | |
|---|---|---|---|
| 3,716,169 A | | 2/1973 | Chivers |
| 5,125,393 A | * | 6/1992 | Levitin .................. A47J 36/36 |
| | | | 220/608 |
| 5,889,261 A | | 3/1999 | Boardman |
| 6,037,570 A | | 3/2000 | Noles |
| 7,091,455 B2 | | 8/2006 | Fung |
| 2001/0036124 A1 | * | 11/2001 | Rubenstein ............ A47J 43/042 |
| | | | 366/205 |
| 2005/0284861 A1 | | 12/2005 | Fung |
| 2013/0213237 A1 | | 8/2013 | De Jong et al. |
| 2014/0246428 A1 | | 9/2014 | Bodum |
| 2016/0037957 A1 | * | 2/2016 | Lv ............................ H05B 3/04 |
| | | | 219/432 |
| 2016/0178276 A1 | | 6/2016 | Park |
| 2016/0192803 A1 | * | 7/2016 | Doyle ............... A47J 27/21008 |
| | | | 219/439 |
| 2017/0143154 A1 | | 5/2017 | Li et al. |
| 2017/0331223 A1 | | 11/2017 | Cooper et al. |
| 2021/0204746 A1 | | 7/2021 | Katsunuma |

FOREIGN PATENT DOCUMENTS

| | | |
|---|---|---|
| CN | 101579191 | 11/2009 |
| CN | 201585852 | 9/2010 |
| CN | 201798540 | 4/2011 |
| CN | 201806515 | 4/2011 |
| CN | 204158224 | 2/2015 |
| CN | 204813395 | 12/2015 |
| CN | 105795906 | 7/2016 |
| CN | 206026037 | 3/2017 |
| CN | 206102411 | 4/2017 |
| CN | 206239137 | 6/2017 |
| CN | 206491677 | 9/2017 |
| CN | 105534300 | 6/2018 |
| CN | 108185809 | 6/2018 |
| CN | 108477999 | 9/2018 |
| CN | 108851975 | 11/2018 |
| CN | 108937568 | 12/2018 |
| CN | 109259594 | 1/2019 |
| EP | 1 597 989 | 11/2005 |
| EP | 2 763 576 | 8/2014 |
| EP | 2 974 630 | 1/2016 |
| EP | 2805649 | 5/2018 |
| FR | 2 911 769 | 8/2008 |
| GB | 2195234 | 4/1988 |
| GB | 2 330 064 | 4/1999 |
| JP | 2009-285170 | 12/2009 |
| JP | 2009-291418 | 12/2009 |
| JP | 2012-101004 | 5/2012 |
| JP | 4927688 | 5/2012 |
| JP | 2012-147830 | 8/2012 |
| JP | 2012-254202 | 12/2012 |
| JP | 5487435 | 5/2014 |
| JP | 2014-223194 | 12/2014 |
| JP | 2016-214429 | 12/2016 |
| KR | 20-0406420 | 1/2006 |
| KR | 10-2016-0076391 | 6/2016 |
| WO | WO 2006/081915 | 8/2006 |
| WO | WO 2008/155538 | 12/2008 |
| WO | WO 2011/078814 | 6/2011 |
| WO | WO 2012/016344 | 2/2012 |
| WO | WO 2016/156096 | 10/2016 |
| WO | WO 2020/153825 | 7/2020 |

OTHER PUBLICATIONS

U.S. Office Action dated Feb. 2, 2022 issued in U.S. Appl. No. 16/826,505.
International Search Report dated Jun. 24, 2020 issued in PCT Application No. PCT/KR2020/003732.
Article entitled, "Electric Wireless Glass Kettle With Blue Illumination LED Light, Temperature Monitoring 1.7L: Amazon.de: Kuche & Haushalt," dated Jul. 16, 2020.
European Search Report dated Aug. 5, 2020 issued in EP Application No. 20164490.3.
U.S. Office Action dated Feb. 1, 2022 issued in U.S. Appl. No. 16/826,406.
International Search Report dated Jun. 24, 2020 issued in Application No. PCT/KR2020/003731.
International Search Report dated Jul. 2, 2020 issued in Application No. PCT/KR2020/003730.
European Search Report dated Jul. 15, 2020 issued in Application No. 20164445.7.
European Search Report dated Aug. 31, 2020 issued in Application No. 20164498.6.
European Search Report dated Aug. 17, 2020 issued in EP Application No. 20164447.3.
European Search Report dated Aug. 17, 2020 issued in EP Application No. 20164465.5.
European Search Report dated Jul. 29, 2020 issued in EP Application No. 20164483.8.
European Search Report dated Jul. 5, 2021 issued in Application No. 20164502.5.
European Search Report dated Sep. 30, 2020 issued in EP Application No. 20164502.5.
U.S. Office Action dated Mar. 30, 2022 issued in U.S. Appl. No. 16/826,465.

* cited by examiner

ELECTRIC KETTLE

CROSS-REFERENCE TO RELATED APPLICATION(S)

The present application claims priority under 35 U.S.C. 119 and 35 U.S.C. 365 to Korean Patent Application No. 10-2019-0032611, filed in Korea on Mar. 21, 2019, which is hereby incorporated by reference in its entirety.

BACKGROUND

1. Field

An electric kettle is disclosed herein.

2. Background

In general, an electric kettle is a device that is supplied with electricity to heat a fluid, such as water contained in a main body using a heating means, such as a heater. An electric kettle is configured such that a main body is detachable from a base to which power is supplied. The main body is heated in a state of being seated on the base and is separated from the base by holding a handle and lifting the main body. This type of an electric kettle is called many names, such as a wireless electric kettle, a wireless electric pot, and a coffee pot.

In such an electric kettle, a main body may have a complicated shape and may be made of a plastic material so as to facilitate the arrangement of the internal structure. However, when the electric kettle is used for a long time, harmful components of plastics or fine plastic components may be dissolved in hot water, and the electric kettle is vulnerable to scratches, thus causing internal contamination problems.

If a main body is made of a glass material, an electric kettle is excellent in hygiene and looks very good. However, there is a risk of damage due to impact, for example, the heavy weight makes it inconvenient to use, and molding is not easy.

Korean Utility Model Registration No. 20-0406420, which is hereby incorporated by reference, discloses a wireless electric pot that has a main body made of stainless steel and is capable of heating water contained therein. In such a structure, the main body is made of stainless steel, which is very hygienic and durable.

However, in such a structure, when water boils, a temperature of the main body also rises, which may cause burns when a user's body contacts an outer surface of the main body. Also, there is a problem that the water is cooled quickly after the heating is completed, thus increasing power consumption.

U.S. Pat. No. 7,091,455, which is hereby incorporated by reference, discloses an electric kettle in which a body in which water is heated is provided with an inner container and an outer container, which are made of stainless steel, and the body has a double-layer vacuum structure to improve heat insulation performance. However, as the structure of the body has the vacuum structure, there is a limitation in the configuration for an operation of a handle portion and an arrangement of electric wires for connecting a heater. Assembly workability of the configuration connected to the body is deteriorated, and a sense of unity of overall appearance is deteriorated.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described in detail with reference to the accompanying drawings. However, embodiments are not limited to proposed embodiments, and other regressive inventions or other embodiments included in the scope may be easily proposed through addition, change, deletion, and the like of other elements.

Figure 1:
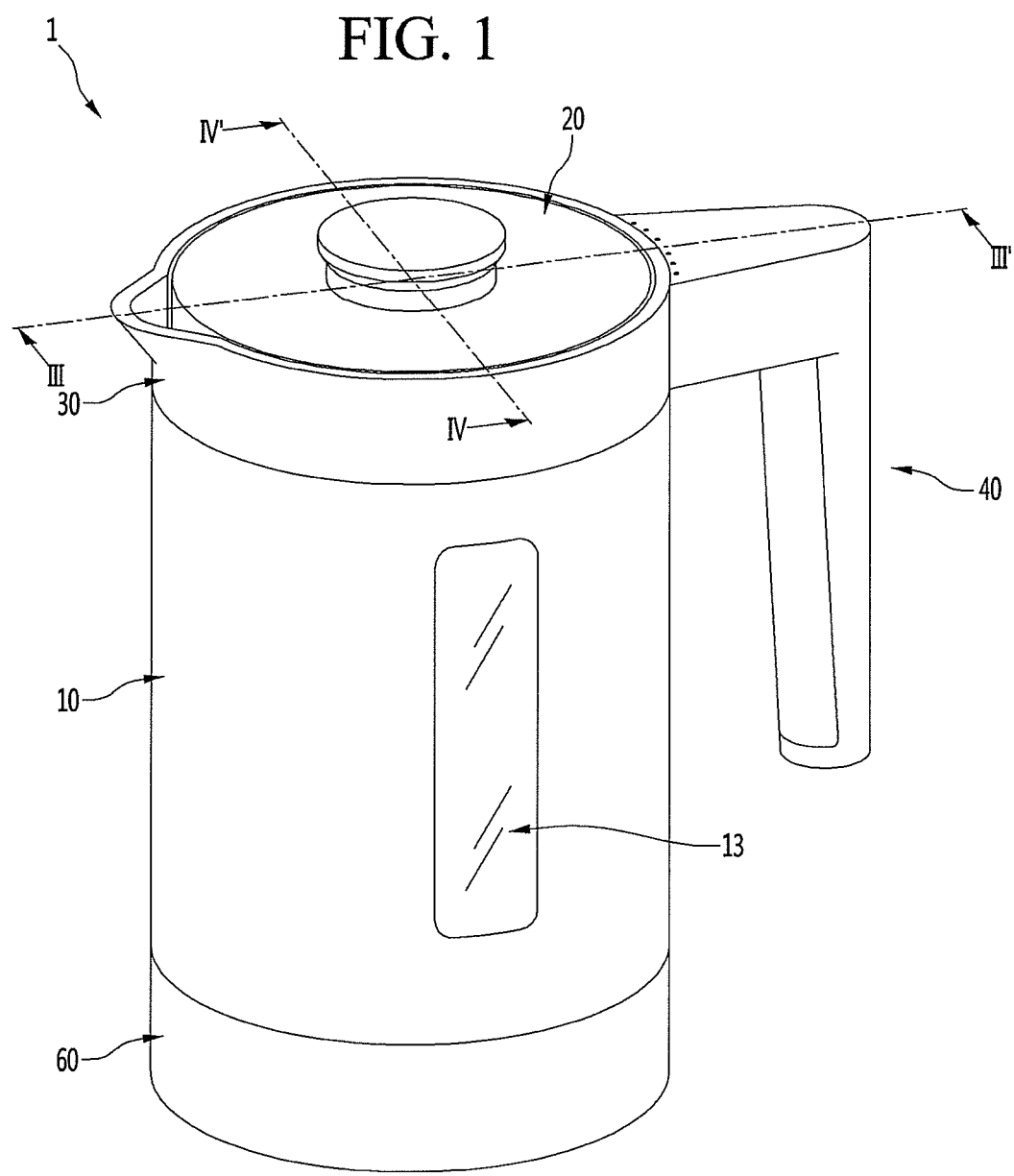
FIG. 1 is a perspective view of an electric kettle according to an embodiment.
Figure 2:
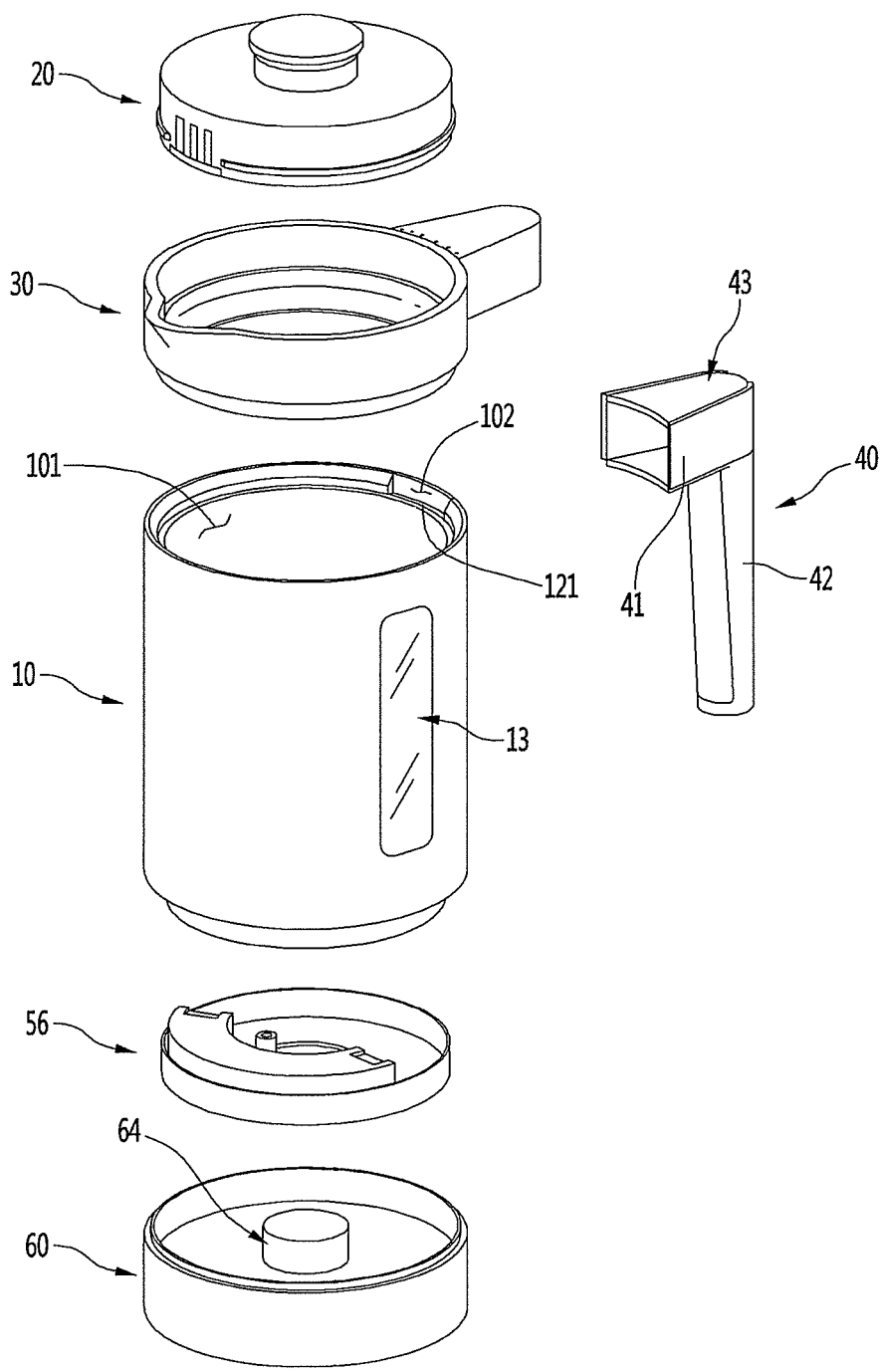
FIG. 2 is an exploded perspective view of the electric kettle of FIG. 1.
Figure 3:
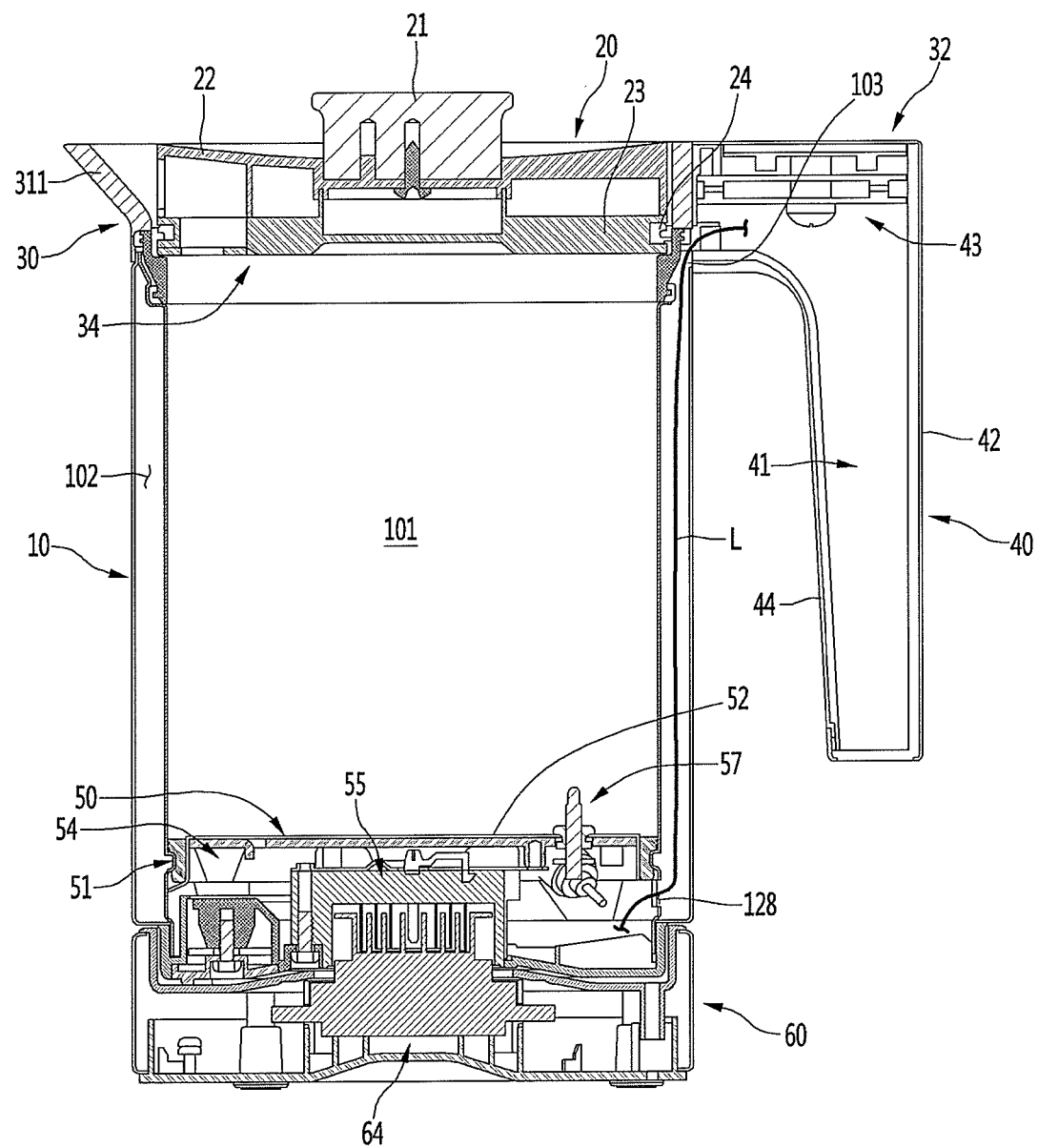
FIG. 3 is a cross-sectional view taken along line III-III' of FIG. 1.
Figure 4:
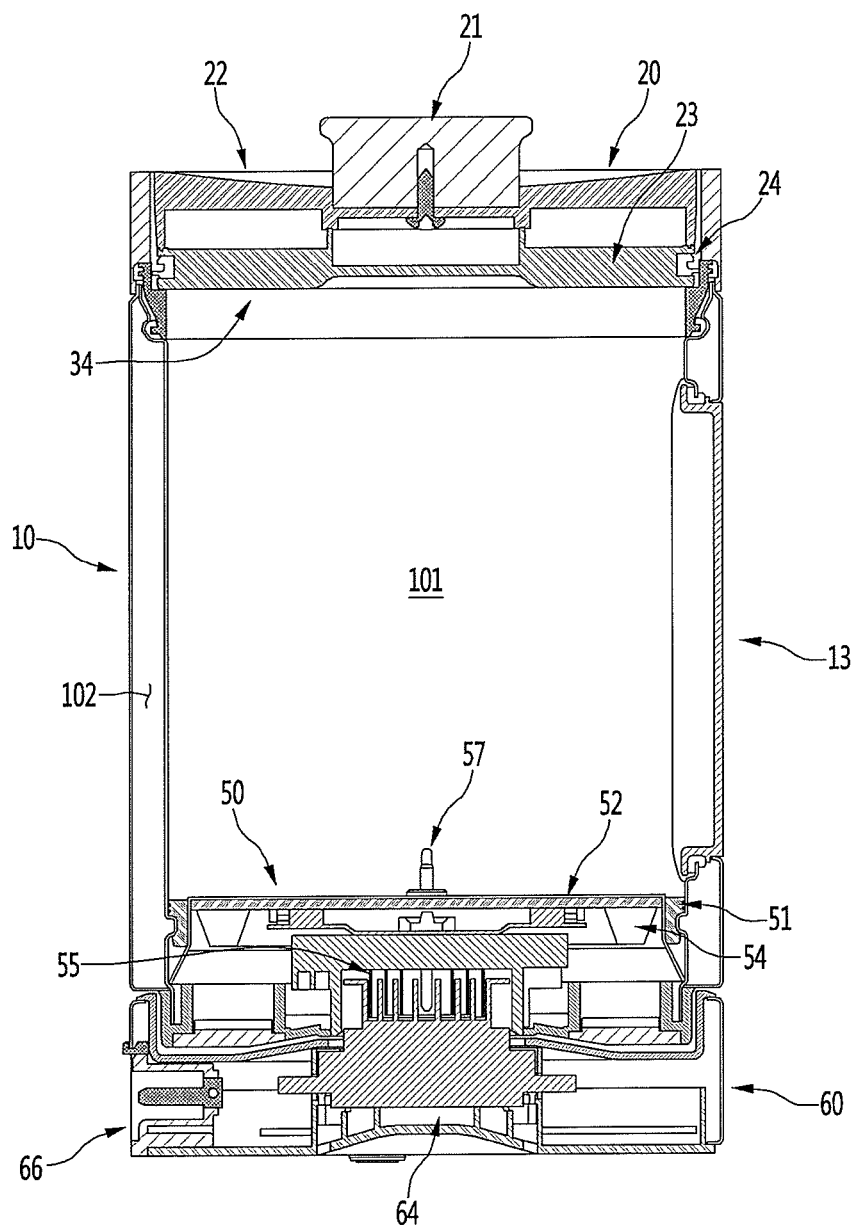
FIG. 4 is a cross-sectional view taken along line IV-IV' of FIG. 1.

FIG. 1 is a perspective view of an electric kettle according to an embodiment. FIG. 2 is an exploded perspective view of the electric kettle of FIG. 1. FIG. 3 is a cross-sectional view taken along line III-III' of FIG. 1. FIG. 4 is a cross-sectional view taken along line IV-IV' of FIG. 1.

As shown in FIGS. 1 to 4, an electric kettle 1 according to an embodiment may be formed in a cylindrical shape as a whole and may include a base 60, a body 10, an upper body 30, a heating module 50, a lid 20, and a handle 40. The other components except for the handle 40 may be formed in a cylindrical shape and arranged vertically. The handle 40 may protrude from one side of the upper body 30.

The base 60 may be disposed on a floor surface, for example, and a power cord may be connected to the base 60 such that external power may be supplied thereto. The body 10 in an assembled state may be seated on an upper surface of the base 60. The body 10 may be formed in a cylindrical shape to define a heating space 101 in which fluid, such as water may be contained and heated. The body 10 may be supplied with power in a state of being seated on the base 60. A power supply method of the base 60 and the body 10 may be a power supply method by contact of a power terminal, for example. Also, the power supply method of the base 60 and the body 10 may be an electromagnetic induction method. The base 60 may be provided with a lower power module 64 serving as a primary coil, and the body 10 may be provided with an upper power module 55 serving as a secondary coil.

The body 10 may be formed in a cylindrical shape having an open upper surface and an open lower surface. The open lower surface of the body 10 may be covered by the heating module 50, and the upper surface of the body 10 may be covered by the lid 20. As the heating module 50 forms a portion of a lower portion of the body 10, the heating module 50 may also be referred to as a lower body 50.

The heating module 50 may include a heating plate 52 forming a bottom surface of an inside of the body 10, and a heater 54 that heats the heating plate 52. The heating plate 52 may be heated by power supplied from the upper power module 55. The heating module 50 may include a bottom cover 56 that forms a lower surface of the body 10.

The upper body 30 may be mounted on an upper end of the body 10. The upper body 30 may be made of a same metal material as that of the body 10, or may be made of another material but have a same texture. The upper body 30 may be formed in a cylindrical or ring shape having a low height. A spout 311 may protrude from one or a first end of the upper body 30 such that fluid, such as water inside of the body 10 may be poured.

The handle 40 may be mounted on a side opposite to the spout 311. The handle 40 may be mounted on a handle cover 32 that extends outward from one or a first side of the upper body 30, and may be fixedly mounted on the outer or a second surface of the upper body 30.

The handle 40 may include a handle body 41 inserted into the handle cover 32 and extending downward to be gripped by a user, a handle deco 42 that surrounds the outer surface of the handle body 41, and a grip portion or grip 44 forming a portion of the outer surface of the handle body 41 facing the body 10. The handle deco 42 may be made of a same metal or a same appearance as those of the body 10 and the handle cover 32. The grip portion 44 may be made of a rubber or a silicone material, for example, so as not to slip when the user grips the handle 40.

Figure 10:
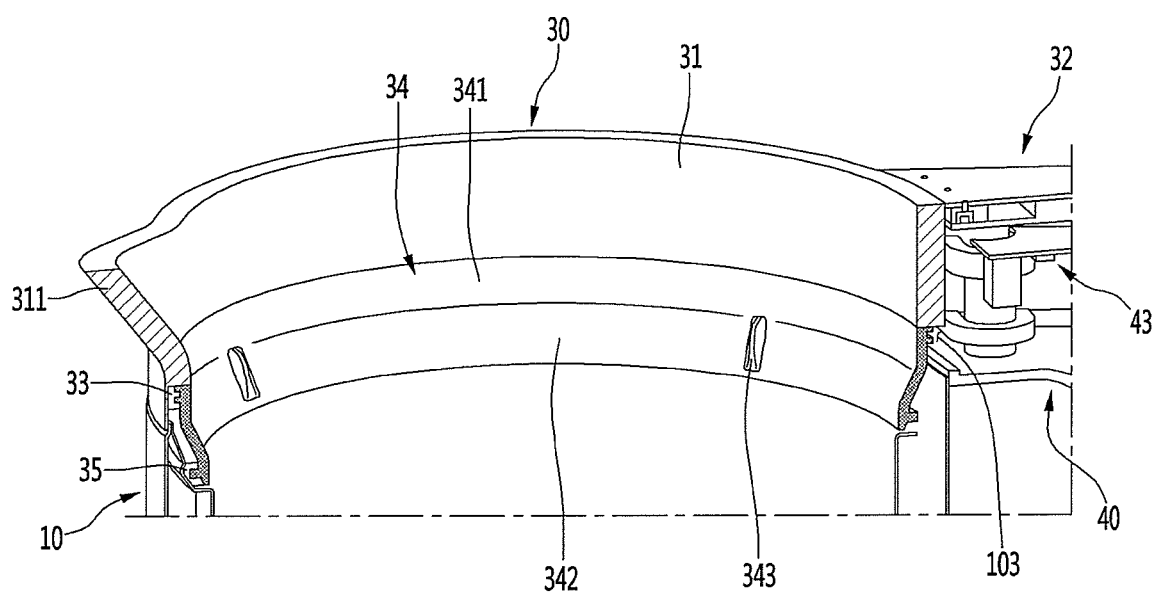
FIG. 10 is a cutaway perspective view showing a connecting structure of the body and the upper body.

The handle cover 32 may be provided with an operation portion 323 (see FIG. 10). The user may input operations, such as an on-off operation or a temperature control operation, through operation of the operation portion 323. A handle printed circuit board (PCB) 43 may be provided inside of the handle cover 32, that is, inside of the handle 40. An electric wire L that connects the handle PCB 43 and the heating module 50 may pass through the body 10. The handle cover 32 may be further provided with a display 322 that displays an operating state of the electric kettle 1.

The open upper surface of the electric kettle 1, that is, the upper surface of the upper body 30, may be covered by the lid 20. The lid 20 may form the upper surface of the electric kettle 1 in a closed state and may contact a circumference of the upper body 30 to seal an inside of the electric kettle 1. When the electric kettle 1 is tilted in a state in which the lid 20 is closed, the electric kettle 1 may be configured such that fluid, such as water is poured from the spout 311 through the lid 20.

Hereinafter, components of the electric kettle 1 will be described. Components not described among the components shown in FIGS. 3 and 4 will be described hereinafter.

Figure 5:
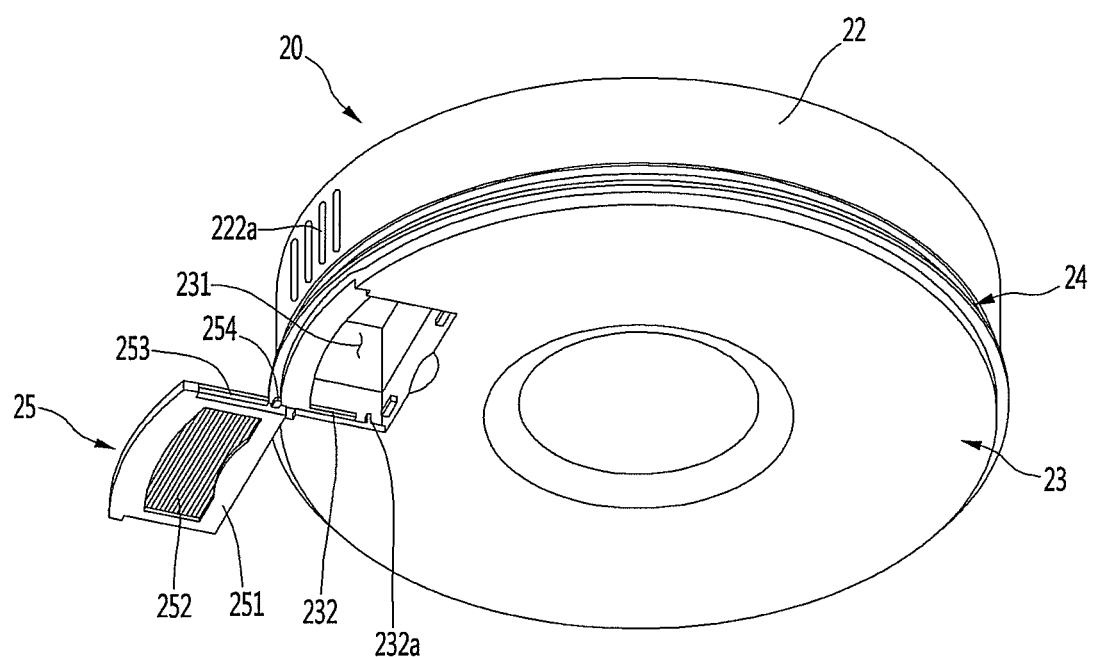
FIG. 5 is a perspective view of a lid, when viewed from below, according to an embodiment.
Figure 6:
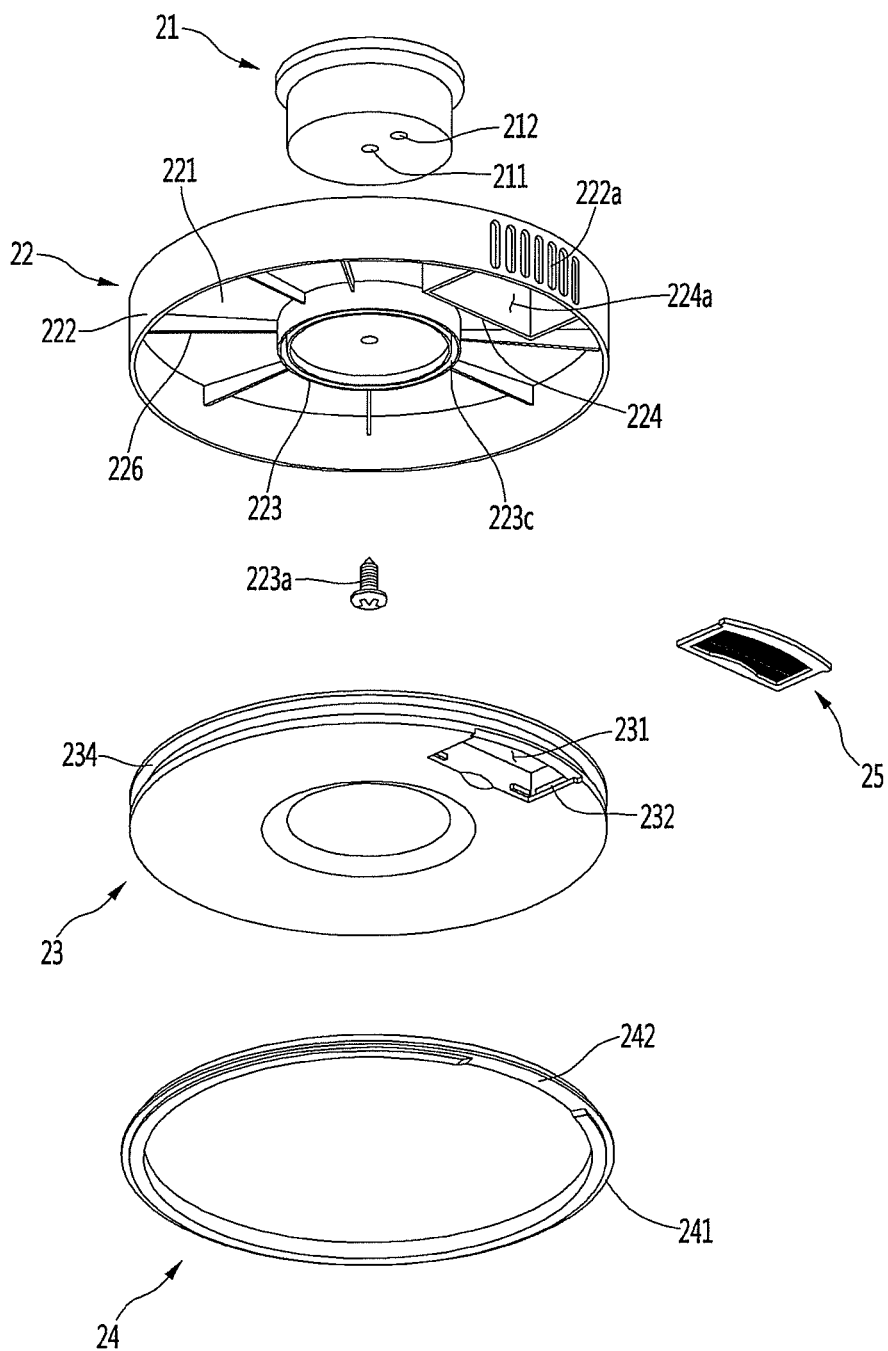
FIG. 6 is an exploded perspective view of the lid of FIG. 5, when viewed from below.
Figure 7:
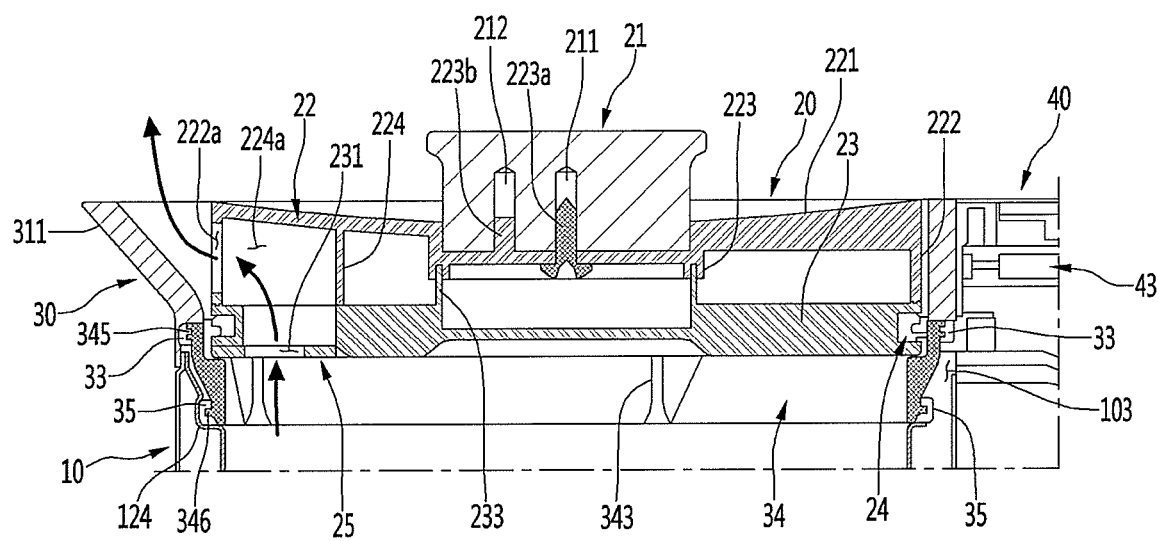
FIG. 7 is a cross-sectional view showing a state in which the lid is mounted on a body which is one component of the electric kettle of FIG. 1.

FIG. 5 is a perspective view of the lid, when viewed from below, according to an embodiment. FIG. 6 is an exploded perspective view of the lid of FIG. 5, when viewed from below. FIG. 7 is a cross-sectional view showing a state in which the lid of FIG. 5 is mounted on the body which is one component of the electric kettle.

As shown, the lid 20 may be formed in a shape corresponding to an inner cross-section of the electric kettle 1. An appearance of the lid 20 may be formed by combining an upper case 22 forming an upper appearance and a lower case 23 forming a lower appearance.

The upper case 22 may form an upper surface and a portion of a circumferential surface of the lid 20, and a lid handle 21 may be mounted at a center of the upper case 22. A coupling hole 211 may be formed at a center of the lid handle 21, and a screw 223a that passes through the center of the upper case 22 may be coupled to the coupling hole 211. A lid protrusion 223b and a lid groove 212 connected to each other may be respectively formed on lower surfaces of the upper case 22 and the lid handle 21 to prevent the lid handle 21 from rotating.

The upper case 22 may include a circular upper surface 221 and a circumferential surface 222 that extends downward from a circumference of the upper surface 221. A lid connecting portion 223 that protrudes downward may be formed at a center of the upper surface 221. The lid connecting portion 223 may be formed in a circular shape, and an inner portion of the lid connecting portion 223 may be recessed to define a space in which the handle lid 20 may be seated. A groove 223c into which a lower rib 233 described hereinafter may be inserted may be formed at an extended lower end of the lid connecting portion 223.

A plurality of reinforcing ribs 226 may be formed radially from an outer surface of the lid connecting portion 223 to the circumferential surface 222 of the upper case 22. A fluid outlet 222a that passes through the circumferential surface 222 may be formed at one or a first side of the circumferential surface 222 of the upper case 22. The fluid outlet 222a may be formed at a position corresponding to spout 311 as a portion that becomes an outlet of the lid 20 when fluid, such as water inside of the electric kettle 1 is poured. The fluid outlet 222a may be formed in a grill-like shape as shown, or may include a plurality of holes.

Inner walls 224 that extend rearward may be formed at both sides of the fluid outlet 222a. The inner walls 224 may be formed along a circumference of a fluid inlet 231 described hereinafter. A front end of inner wall 224 may be in contact with both ends of the fluid outlet 222a. An open lower end of the inner wall 224 may be covered by the lower case 23 when the upper case 22 and the lower case 23 are connected to each other, and may define a fluid outlet space 224a to communicate the fluid inlet 231 and the fluid outlet 222a. Therefore, fluid such as water flowing into the fluid inlet 231 may be discharged to the fluid outlet 222a through the fluid outlet space 224a. That is, fluid, such as water inside of the electric kettle 1 may be poured through the spout 311 after passing through the lid 20.

The lower case 23 may be formed in a disk shape corresponding to the upper case 22, and a circumference of the lower case 23 may be connected to a circumference of the upper case 22. Lower rib 233 may protrude from a central portion of the lower case 23 corresponding to the lid connecting portion 223. The lower rib 233 may be inserted into the groove 223c formed at the end of the lid connecting portion 223, and may be joined to the groove 223c by, for example, ultrasonic welding in an inserted state. A lid gasket groove 234, on which lid gasket 24 may be mounted, may be formed on the circumference of the lower case 23.

The lid gasket 24 may be formed in a ring shape and may be made of a rubber or a silicone material, for example. The lid gasket 24 may be in close contact with an inner circumferential surface of the upper body 30 in a state in which the lid 20 is mounted on the electric kettle 1, thereby sealing the inside of the electric kettle 1.

A gasket rib 241 that protrudes outward may be formed on an outer surface of the lid gasket 24. The gasket rib 241 is a portion that is configured to be substantially in contact with the inner circumferential surface of the upper body 30. The gasket rib 241 may be completely in contact with the inner circumferential surface of the upper body 30 while being deformed when the lid 20 is mounted or removed.

A filtering member 25 may be mounted on the fluid inlet 231. The filtering member 25 may cover the fluid inlet 231 to filter foreign matter from fluid, such as water flowing toward the fluid inlet 231. The filtering member 25 may include a filter frame 251 having an open central portion and a filter 252 that covers the opening. For example, the filter 252 may be provided with a mesh.

The filtering member 25 may be detachable from the fluid inlet 231. When the filtering member 25 is not required, the filtering member 25 may be separated from the lid 20 so as to discharge fluid more smoothly.

The filter frame 251 may be formed in a size corresponding to a size of the fluid inlet 231. A sliding rib 253 may protrude from both lateral ends of the filter frame 251, and a filter restraint protrusion 254 may be formed behind the sliding rib 253. The filter restraint protrusion 254 may protrude toward both sides at a position spaced apart from a rear end of the filter frame 251.

A sliding groove 232, into which the sliding rib 253 may be inserted, may be formed at both sides of the fluid inlet 231. The sliding rib 253 may guide movement of the filtering member 25 while moving along the sliding groove 232.

A filter restraint portion 232a, on which the filter restraint protrusion 254 may be caught and restrained, may be formed at a rear of the sliding groove 232. In a state in which the filtering member 25 is mounted on the fluid inlet 231, the sliding rib 253 may be accommodated inside of the sliding groove 232, and the filter restraint protrusion 254 may be caught and restrained on the filter restraint portion 232a.

Therefore, the filtering member 25 may maintain a mounted state, and if necessary, may be slidably separated by pulling forward.

The gasket rib 241 may protrude outward along a circumference of the lid gasket 24, but the gasket rib 241 is not formed at a portion corresponding to the fluid inlet 231. That is, a gasket recess 242 may be formed in the lid gasket 24 corresponding to the fluid inlet 231. Therefore, even in a state in which the lid gasket 24 is mounted on the lid 20, the lid gasket 24 and the filtering member 25 may be prevented from interfering with each other even if the filtering member 25 is slidably detached from the fluid inlet 231.

The lid 20 may be seated on the upper body 30 in a state of being inserted into the open upper surface of the electric kettle 1. In a state in which the lid 20 is seated on the upper body 30, the upper end of the upper case 22 is positioned at a same height as a height of the upper end of the upper body 30. Therefore, the lid 20 and the upper body 30 may have a sense of unity.

Hereinafter, a seating structure of the lid 20 and a structure of the upper body 30 will be described. Components not described among the components shown in FIG. 7 will be described below.

Figure 8:
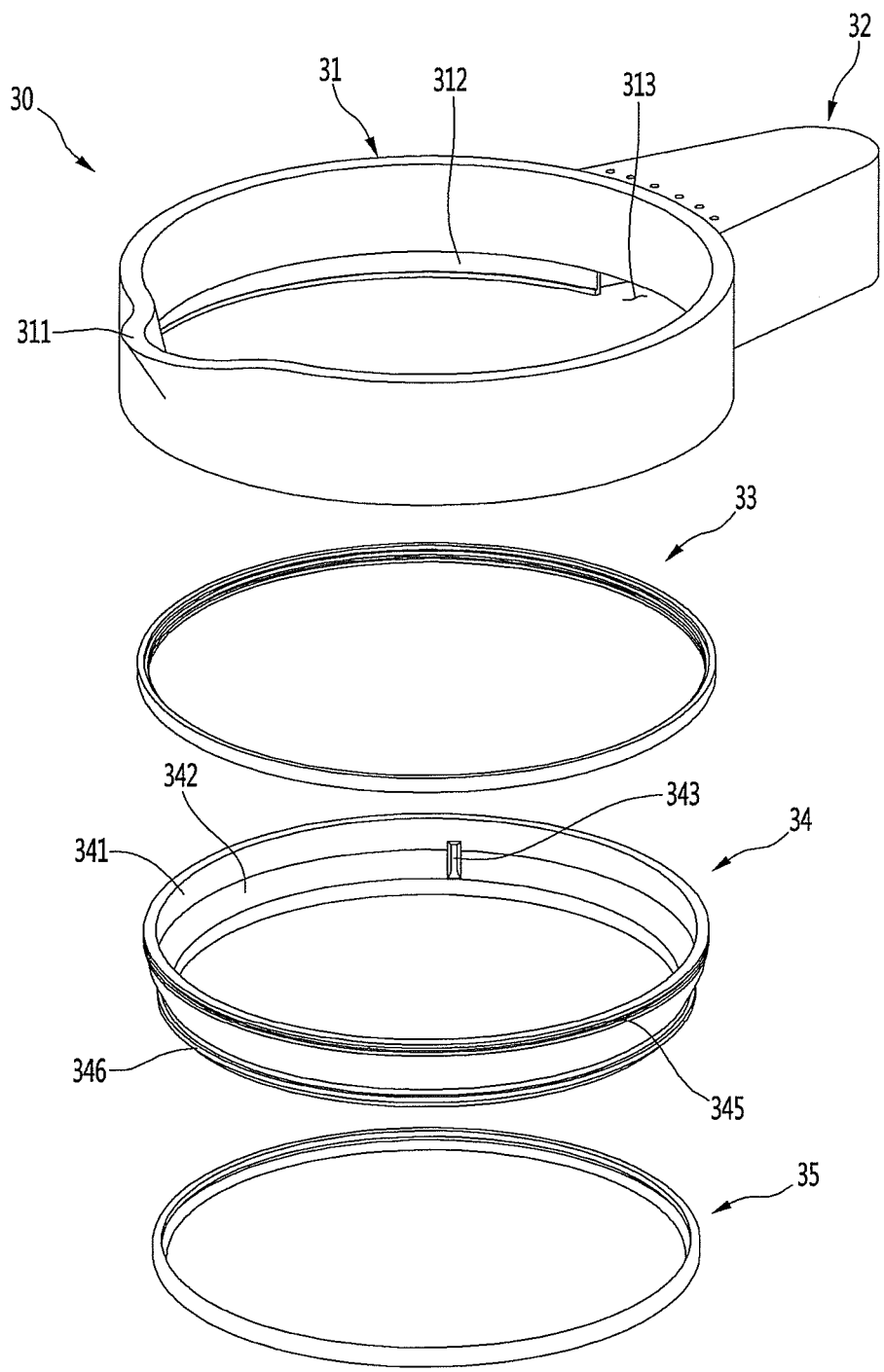
FIG. 8 is an exploded perspective view of an upper body that is one component of the electric kettle of FIG. 1.
Figure 9:
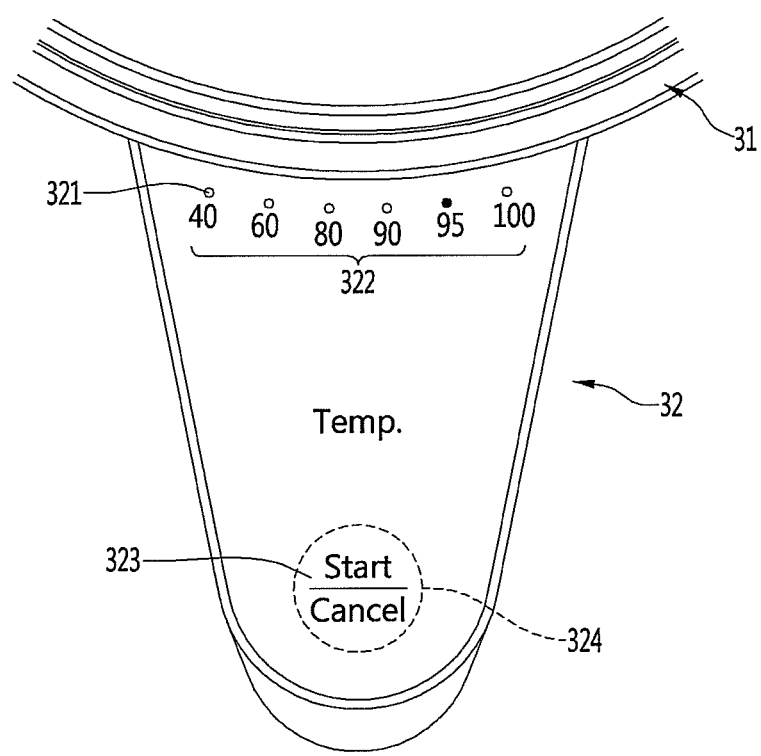
FIG. 9 is a partial enlarged view showing an operation portion of the upper body of FIG. 8.

FIG. 8 is an exploded perspective view of an upper body which is one component of the electric kettle of FIG. 1. FIG. 9 is a partial enlarged view showing an operation portion of the upper body of FIG. 8. FIG. 10 is a cutaway perspective view showing a connecting structure of the body and the upper body.

As shown in FIGS. 8 to 10, the upper body 30 may be mounted on the upper end of the body 10, and the lid 20 may be seated thereon. The upper body 30 may include a body top 31, a seating member 34 connected to the body top 31, and a pair of packings 33 and 35 provided in the seating member 34.

The body top 31 may be made of a metal material, for example, and may be surface-processed to have a same texture as the body 10. When the upper body 30 is mounted on the upper end of the body 10, only the body top 31 may be exposed to the outside, and the seating member 34 may be fixed to the upper end of the body 10. In this state, the body top 31 and the outer surface of the body 10 may be coplanar.

The body top 31 may be formed in a ring shape having a same inner diameter and outer diameter as those of the body 10. The body top 31 may provide a space for accommodating the lid 20 therein.

The recessed spout 311 may be formed at an upper end of one or a first side of the body top 31. The handle cover 32 may be provided at the other or a second side of the body top 31 facing the spout 311.

The handle cover 32 allows the handle 40 to be mounted, may be made of a plate-shaped metal material, and may be formed to accommodate the upper end of the handle 40. The handle cover 32 may form the operation portion on the upper surface 325, and the side surface 326 may extend downward along the circumference of the upper surface of the handle cover 32. In this case, the upper surface 325 of the handle cover 32 may be positioned at a same height as that of the upper end of the body top 31, and the lower end of the side surface 326 of the handle cover 32 may correspond to the lower end of the body top 31. The open front end of the handle cover 32 may have a shape corresponding to the outer surface of the body top 31 and may be connected by welding, for example.

A body top opening 313 may be formed at the lower end of the body top 31 corresponding to the handle cover 32. The body top opening 313 may be formed to communicate with the front end of the handle cover 32, and may be formed in a shape recessed at the lower end of the body top 31. The body top opening 313 forms a hole passing through the body 10 when the upper body 30 and the body 10 are connected to each other, and forms a hole through which an electric wire L connected to the heating module 50 passes inside of the handle cover 32 and the handle 40.

As shown in FIG. 9, the upper surface of the handle cover 32 may be provided with an operation portion 323 for the user to perform a press operation and a display 322 that displays an operating state of the electric kettle 1. The operation portion 323 may be formed on the upper surface 325 of the handle cover by printing or surface processing, for example. A switch or a sensor 323 may be provided below the operation portion 323, that is, at a corresponding position inside of the handle cover 32 to sense the operation performed on the operation portion 323.

The display 322 may display a temperature of fluid inside of the electric kettle 1. The display 322 may include a plurality of holes 321, and LEDs disposed below the holes 321 may be turned on to illuminate the holes 321. Temperatures may be displayed in the corresponding holes 321 by printing or surface processing, for example. The user may check lighting of the corresponding hole 321 to know a current fluid temperature. In order to implement the operation portion 323 and the display 322, the handle PCB 43 may be disposed inside of the handle cover 32.

A packing groove 312 may be formed along a lower end of an inner surface of the body top 31. The packing groove 312 is a groove in which the upper packing 33 may be mounted and enable a fixed mounting and sealing of the seating member 34.

The seating member 34 may be, for example, injection-molded with a plastic material and may connect the upper body 30 and the body 10 and allow the lid 20 to be seated. That is, the seating member 34 may be formed in a ring shape and may include a seating member upper portion 341 coupled to the upper body 30 and a seating member lower portion 342 coupled to the body 10. The seating member upper portion 341 may extend vertically and may be sealed in contact with the lid gasket 24 when the lid 20 is mounted.

An upper packing mounting portion 345, on which the upper packing 33 may be mounted, may be formed on an outer surface of the seating member upper portion 341. An inner surface of the upper packing 33 may be formed in a shape corresponding to the upper packing mounting portion 345 and may be connected to the upper packing mounting portion 345 in a sealed state. The body top 31 and the seating member 34 may be connected to each other by the upper packing 33 and may have a sealed structure.

The seating member lower portion 342 may be formed to be slanted such that an inner diameter is narrowed toward a lower side, and a plurality of lid supports 343 may be formed on an inner surface thereof. Each lid support 343 may protrude such that an upper end is in contact with a lower surface of the lid 20, and the plurality of lid supports 343 may be disposed in a direction facing each other.

A lower packing mounting portion 346, on which the lower packing 35 may be mounted, may be formed on an outer surface of the seating member lower portion 342. The lower packing 35 may be coupled to the inner surface of the body 10 in a state in which the lower packing 35 is mounted on the lower packing mounting portion 346. Therefore, the seating member 34 and the upper body 30 may be connected to the body 10 and may have a sealed structure.

In a state in which the upper body 30 is mounted, the seating member 34 is fixed to the body top 31 by the upper packing 33. Therefore, the upper end of the body 10 is inserted between the body top 31 and the seating member 34 so as not to be exposed to the outside. As the lower packing 35 fixed to the lower end of the seating member 34 is inserted into a body restraint groove 124 formed at the upper end of the inner surface of the body 10, the upper body 30 may maintain the state of being connected to the body 10.

In a state in which the upper body 30 is mounted on the body 10, an inner diameter of a lower end of the upper body 30 may be equal to the inner diameter of the body 10, and an outer diameter of the upper body 30 may be identical to the outer diameter of the body 10. Therefore, in a state in which the upper body 30 and the body 10 are connected to each other, stepped portions are not formed at both the inside and the outside, and the upper body 30 and the body 10 may form a same plane.

Hereinafter, structure of the body 10 will be described with reference to the accompanying drawings.

Figure 11:
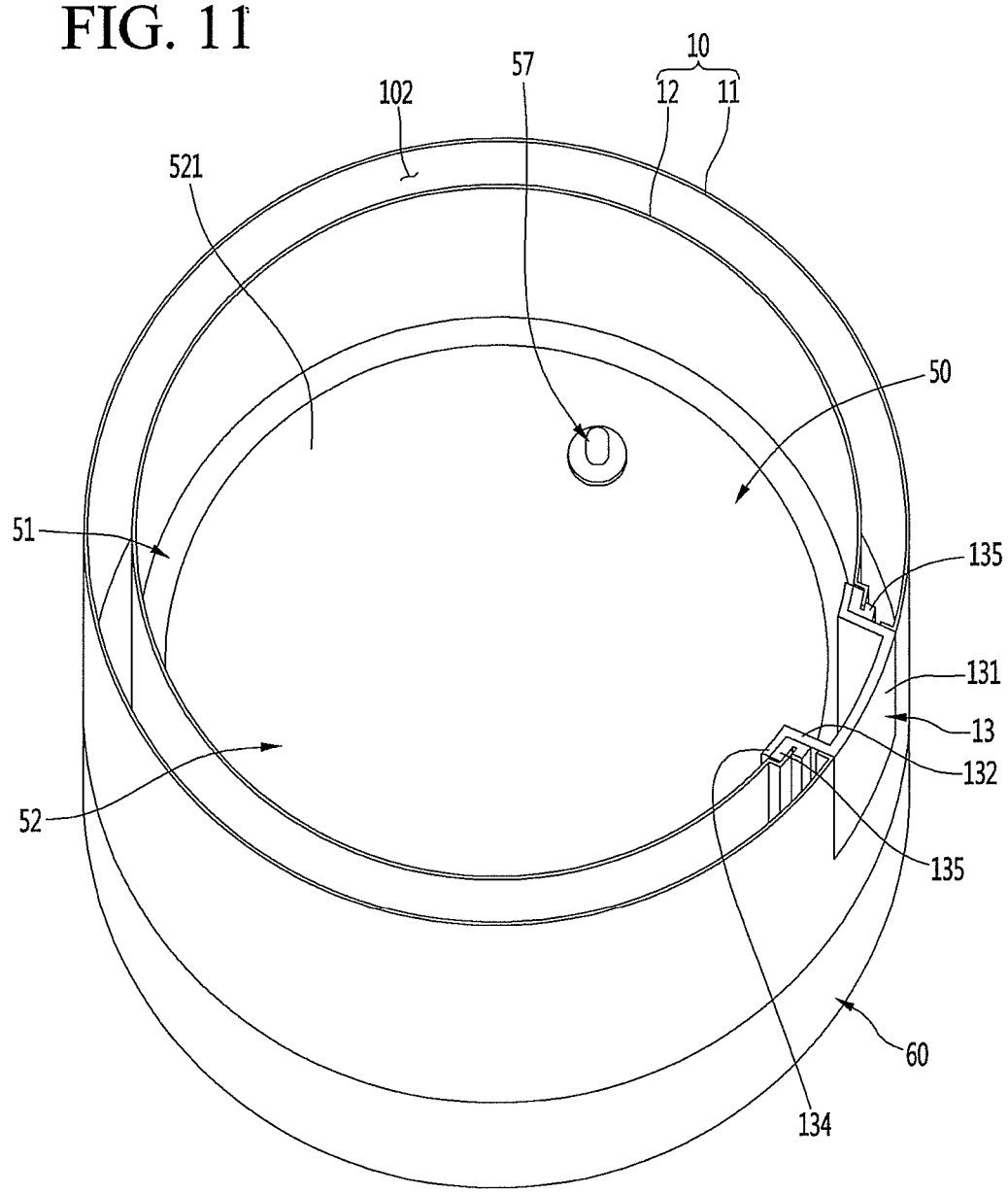
FIG. 11 is a cutaway perspective view showing an inside of the electric kettle of FIG. 1.
Figure 12:
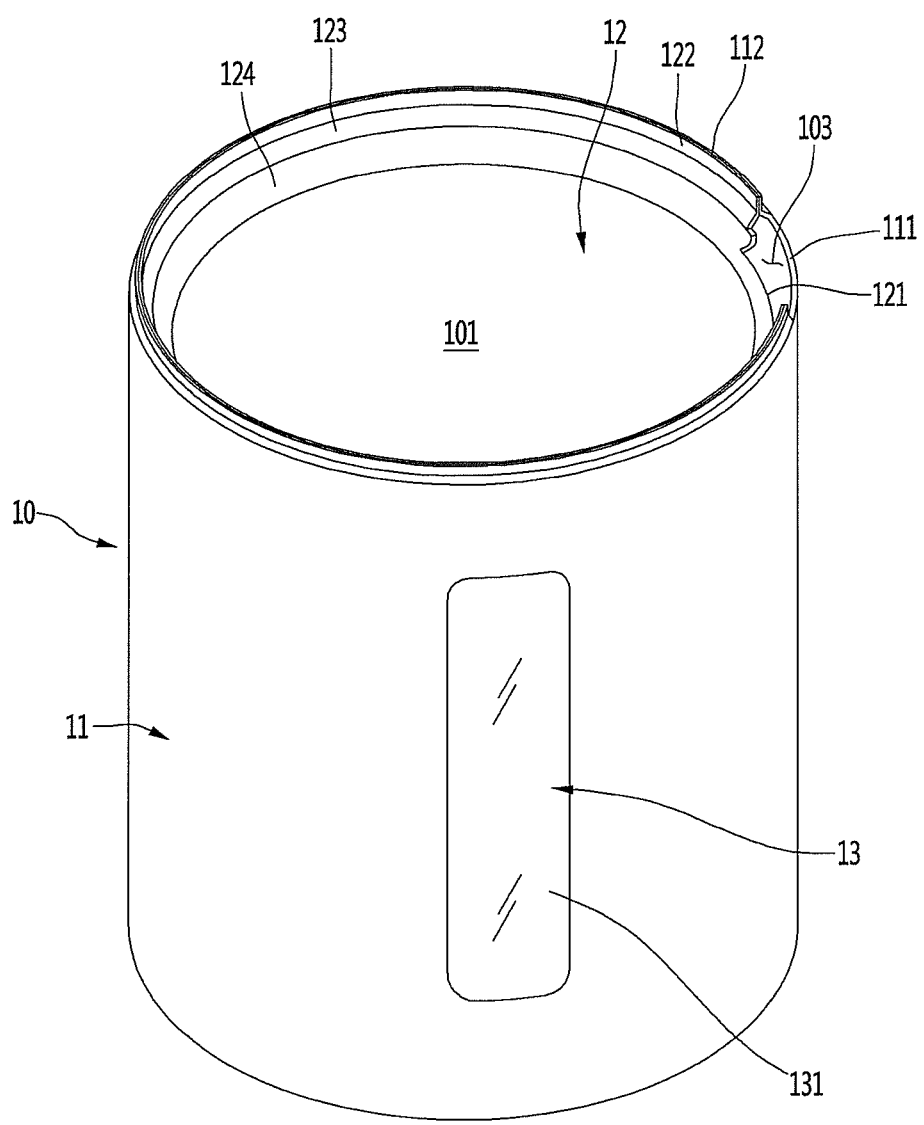
FIG. 12 is a perspective view of the body according to an embodiment.
Figure 13:
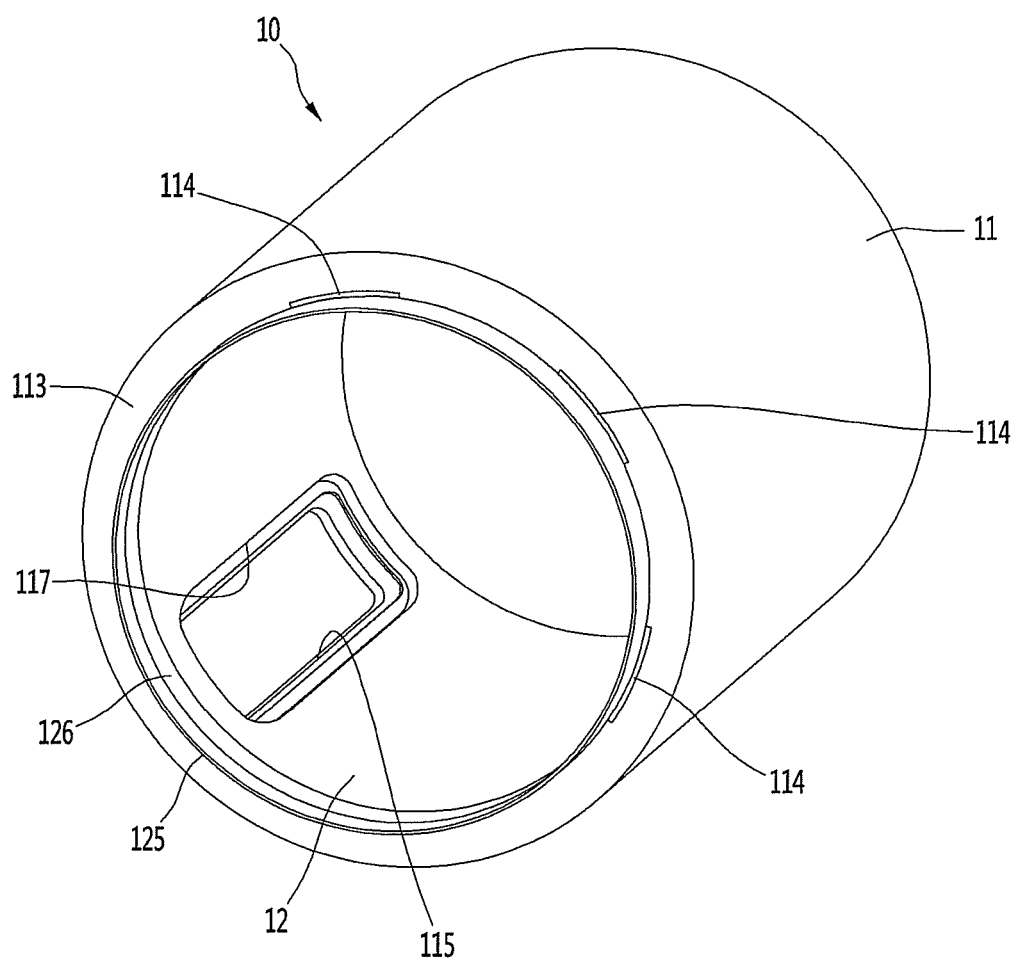
FIG. 13 is a perspective view of the body of FIG. 12, when viewed from below.
Figure 14:
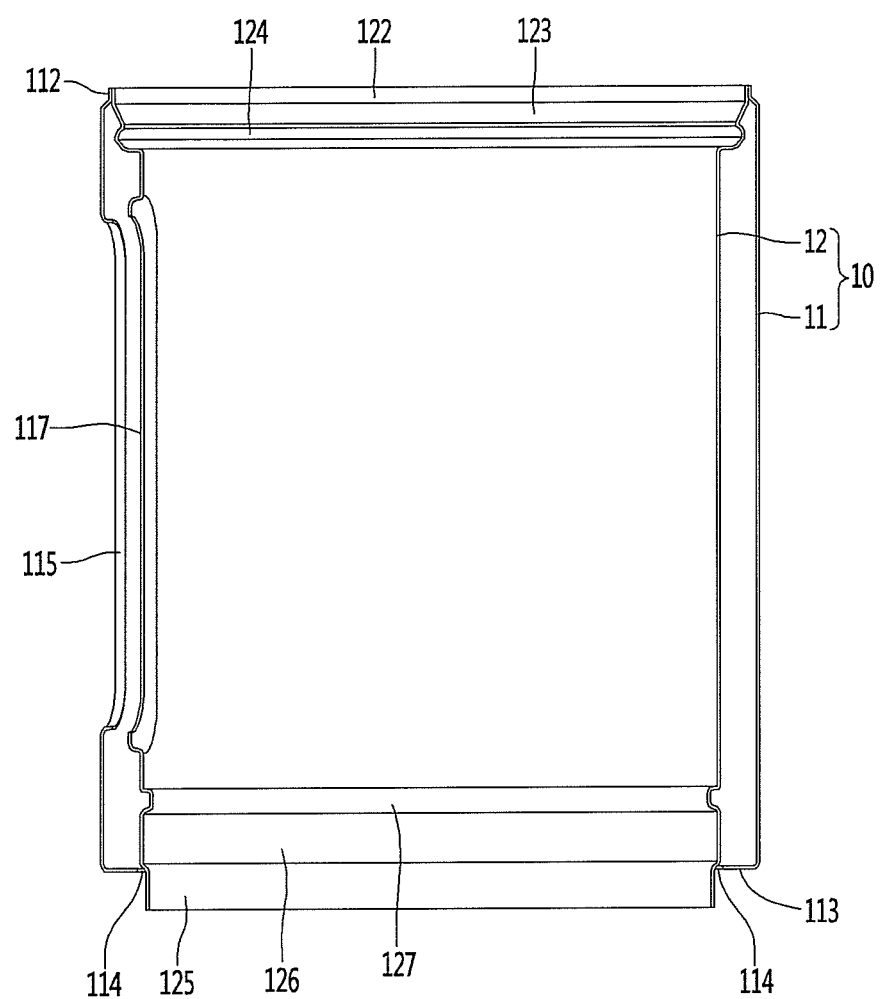
FIG. 14 is a longitudinal sectional view of the body of FIG. 12.
Figure 15:
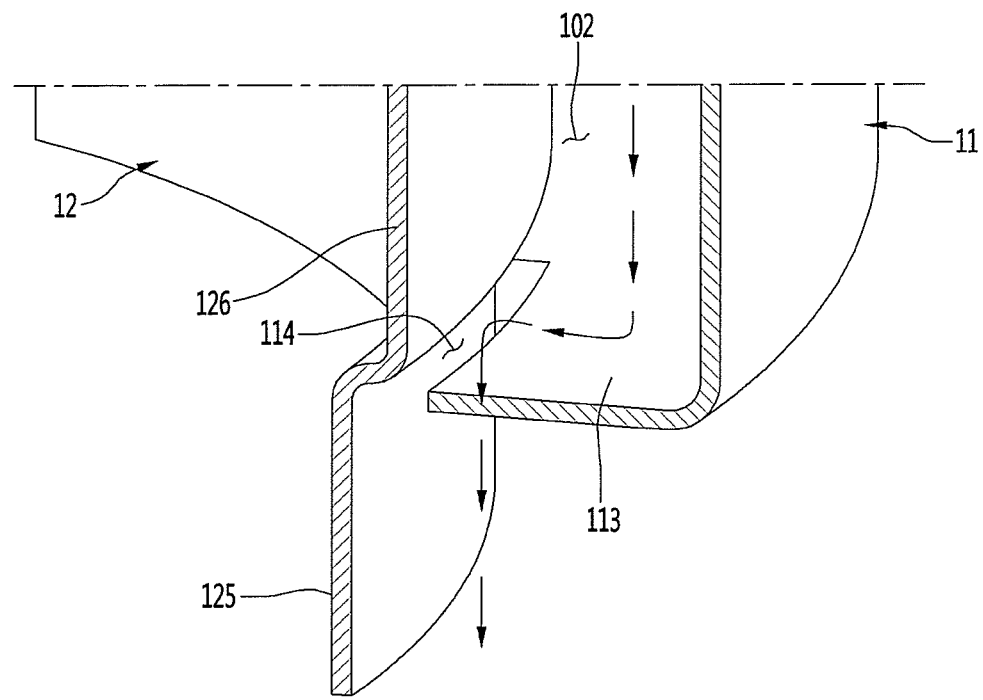
FIG. 15 is a partial enlarged cutaway view of a lower end of the body of FIG. 12.

FIG. 11 is a cutaway perspective view showing an inside of the electric kettle of FIG. 1. FIG. 12 is a perspective view of the body according to an embodiment. FIG. 13 is a perspective view of the body of FIG. 12, when viewed from below. FIG. 14 is a longitudinal sectional view of the body of FIG. 12. FIG. 15 is a partial enlarged cutaway view of the lower end of the body of FIG. 12.

As shown in FIGS. 11 to 15, the body 10 may be formed in a cylindrical shape and may be formed to have the same outer diameter as those of the base 60 and the upper body 30. The body 10 may be formed in a cylindrical shape open vertically, and the open lower surface of the body 10 may be covered by the heating module 50 described hereinafter. That is, fluid, such as water contained in the body 10 may be heated by the heating module 50.

The body 10 may include an inner body 12 and an outer body 11, and a space may be formed between the inner body 12 and the outer body 11, thereby providing significantly improved heat insulation performance as compared with a single wall structure.

The inner body 12 and the outer body 11 may be made of a same stainless steel. The outer body 11 may form an appearance of the body 10, and the inner body 12 may form a space in which fluid may be contained. The inner body 12 has a diameter smaller than that of the outer body 11, and thus, the inner body 12 may be accommodated inside of the outer body 11. Therefore, a space 102 may be formed between the outer body 11 and the inner body 12.

The space 102 between the outer body 11 and the inner body 12 may have an air layer formed therein to prevent heat from being directly transferred to the outer body 11. Therefore, the space 102 may be referred to as "heat insulation space 102". The outer body 11 may maintain a relatively low temperature even when the fluid contained in the inner body 12 is heated to a hot state.

The heat insulation space 102 may communicate with a space in which the heating module 50 is disposed and an inner space of the handle 40. Therefore, the electric wire L connected to the handle PCB 43 disposed at the handle 40 may pass through the heat insulation space 102 between the outer body 11 and the inner body 12 and be guided to the space in which the heating module 50 is disposed. Therefore, the space between the outer body 11 and the inner body 12 may be referred to as an "electric wire passage" or an "electric wire guide space".

The body 10 may be formed by connecting the upper ends and the lower ends of the outer body 11 and the inner body 12 formed in the cylindrical shape. For example, the upper ends and the lower ends of the outer body 11 and the inner body 12 may be connected to each other in a stacked state by, for example, welding. In this case, other portions except for the upper ends and the lower ends of the outer body 11 and the inner body 12 may be spaced apart by a predetermined interval to form a heat insulation structure.

A structure of the upper end of the body 10 will be described hereinafter. An outer upper end portion 112 may be formed at the upper end of the outer body 11. The outer upper end portion 112 may extend upward to form the upper end of the outer body 11, but may be formed in an inwardly stepped shape. The outer upper end portion 112 may be inserted into the upper body 30, and the outer surface of the upper body 30 and the outer surface of the outer body 11 may be coplanar.

An inner upper end portion 122 may be formed at the upper end of the inner body 12. The inner upper end portion 122 may extend upward to form the upper end of the inner body 12. The inner upper end portion 122 may extend to a same height as that of the outer upper end portion 112 and may be in surface contact with the outer upper end portion 112. The outer upper end portion 112 and the inner upper end portion 122 may be inserted into a space between the body top 31 and the seating member 34 of the upper body 30 in a connected state. Therefore, the upper end of the body 10 may be covered by the upper body 30 so as not to be exposed.

An inner slant portion 123 may be formed along a lower end of the inner upper end portion 122. The inner slant portion 123 may slanted such that an inner diameter thereof is narrowed toward a lower side, and may have a slant corresponding to a slanted lower portion of the seating member 34. Therefore, the inner slant portion 123 enables the seating member 34 to be stably supported.

The body restraint groove 124 may be formed along a lower end of the inner slant portion 123. The body restraint groove 124 may be recessed outward such that the lower packing 35 mounted on the upper body 30 may be press-fitted. In order to mount the upper body 30, the upper body 30 may be inserted from above the body 10. In this case, the lower packing 35 may be press-fitted into the body restraint groove 124 to allow the upper body 30 to be fixed. The inner body 12 may extend downward from an end of the body restraint groove 124 and may extend downward in parallel with the outer body 11 while maintaining a predetermined distance.

An outer cutout portion 111 and an inner cutout portion 121 may be respectively formed at the upper end of the inner body 12 and the upper end of the outer body 11, which correspond to the mounting position of the handle cover 32. The outer cutout portion 111 and the inner cutout portion 121 may be formed at a same position and may be formed at a position corresponding to the mounting position of the handle 40. The outer cutout portion 111 and the inner cutout portion 121 may communicate with the open front surface of the handle cover 32. Therefore, when the upper body 30 is mounted on the body 10, the body top opening 313, the outer cutout portion 111, and the inner cutout portion 121 may be positioned at positions corresponding to each other, electric wire outlet 103 through which the electric wire L guided through the heating space 101 between the inner body 12 and the outer body 11 enters and exits may be formed.

A packing mounting portion 127 may be formed at a lower portion of the inner surface of the inner body 12. The packing mounting portion 127 may be provided to mount the heating module 50 and may protrude along the inner surface of the inner body 12 at a position corresponding to the mounting position of the heating module 50. The packing mounting portion 127 may be positioned slightly above the lower end of the outer body 11. Therefore, the heating module 50 may be mounted such that the heating module 50 may be accommodated inside of the inner body 12.

The packing mounting portion 127 may be formed by bending the inner body 12 and may be formed such that a plate packing 51, which is one component of the heating module 50, may be caught and restrained. A plate mounting portion 126 having an inner diameter larger than that of the packing mounting portion 127 may be formed at a lower end of the packing mounting portion 127. The plate mounting portion 126 is a portion in which a heating plate 52 described below may be fixedly mounted and may have an inwardly recessed structure. In this case, an inner diameter of the plate mounting portion 126 may be equal to an inner diameter of the inner body 12 above the packing mounting portion 127. The plate mounting portion 126 has an inner diameter larger than that of the packing mounting portion 127 and an inner lower end portion 125 described hereinafter. A vertical width of the plate mounting portion 126 may be determined according to the vertical width of the packing mounting portion 127.

An electric wire inlet 128 through which the electric wire L may pass may be formed on one or a first side of the plate mounting portion 126. The electric wire inlet 128 is a hole through which the electric wire L connected to the heating module 50 may pass and may be open at the first side of the plate mounting portion 126 corresponding to the position of the handle 40. That is, the electric wire inlet 128 may be positioned on a same extension line as the electric wire outlet 103 below the electric wire outlet 103. Therefore, the electric wire L introduced into the electric wire inlet 128 may pass through the space between the inner body 12 and the outer body 11 and may be guided to the inside of the handle cover 32 through the electric wire outlet 103 disposed at the upper end of the body 10.

The inner lower end portion 125 forming the lower end of the inner body 12 may be formed at the lower end of the plate mounting portion 126. The inner lower end portion 125 may be bent and extend downward from the lower end of the plate mounting portion 126.

An inner diameter of the inner lower end portion 125 may be greater than or equal to the inner diameter of the packing mounting portion 127 such that the heating module 50 may be inserted through the inner lower end portion 125. The inner lower end portion 125 may extend further downward than the outer body 11 and may be connected to the bottom cover 56 described hereinafter.

The lower end of the outer body 11 may extend to the lower end of the plate mounting portion 126 of the inner body 12. An outer lower end portion 113, which is bent toward the inner side, that is, the outer surface of the inner body 12, may be formed at the end of the outer body 11 corresponding to the plate mounting portion 126.

The outer lower end portion 113 may be formed at a height corresponding to a lower end of the plate mounting portion 126 and may extend to an outer end of the inner body 12. That is, an extended end of the outer lower end portion 113 may come into contact with the lower end of the plate mounting portion 126 or an upper end of the inner lower end portion 125. The outer lower end portion 113 may be connected to the lower end of the plate mounting portion 126 or the upper end of the inner lower end portion 125 by, for example, welding. Therefore, the inner body 12 and the outer body 11 have a structure in which the upper end and the lower end are connected to each other.

A body hole 114 may be formed along the outer lower end portion 113. A plurality of body holes 114 may be disposed along the outer lower end portion 113 at regular intervals. The body holes 114 may be formed in a shape in which an extended end of the outer lower end portion 113 is cut away. Remaining portions of the outer lower end portion 113 except for the body hole 114 come into contact with the outer surface of the inner body 12. Therefore, the body hole 114 may naturally become an opening communicating with a space between the inner body 12 and the outer body 11 in the process in which the outer lower end portion 113 is connected to or comes into contact with the outer surface of the inner body 12.

The body 10 may be made of stainless steel and may be formed by a process such as welding, for example. Therefore, the body 10 may be smoothed by electropolishing and maintain a smooth surface in the internal space in which fluid is contained. Also, inner and outer surfaces of the body 10 may have corrosion resistance through electropolishing. For this reason, the body 10 may be subjected to the electropolishing process after the inner body 12 and the outer body 11 are connected to each other.

In order for electropolishing in a state in which the inner body 12 and the outer body 11 are connected to mold the body 10, electropolishing may be performed after the body 10 is immersed in an electrolyte. In this process, due to structural characteristics of the body 10, the electrolyte is inevitably introduced into the heat insulation space 102 between the inner body 12 and the outer body 11. That is, the electric wire inlet 128 and the electric wire outlet 103 are opened in a state in which the body 10 is molded, and when the body 10 is immersed in the electrolyte, the electrolyte is introduced through the electric wire inlet 128 and the electric wire outlet 103. Therefore, the electrolyte is inevitably introduced between the inner body 12 and the outer body 11.

Figure 25:
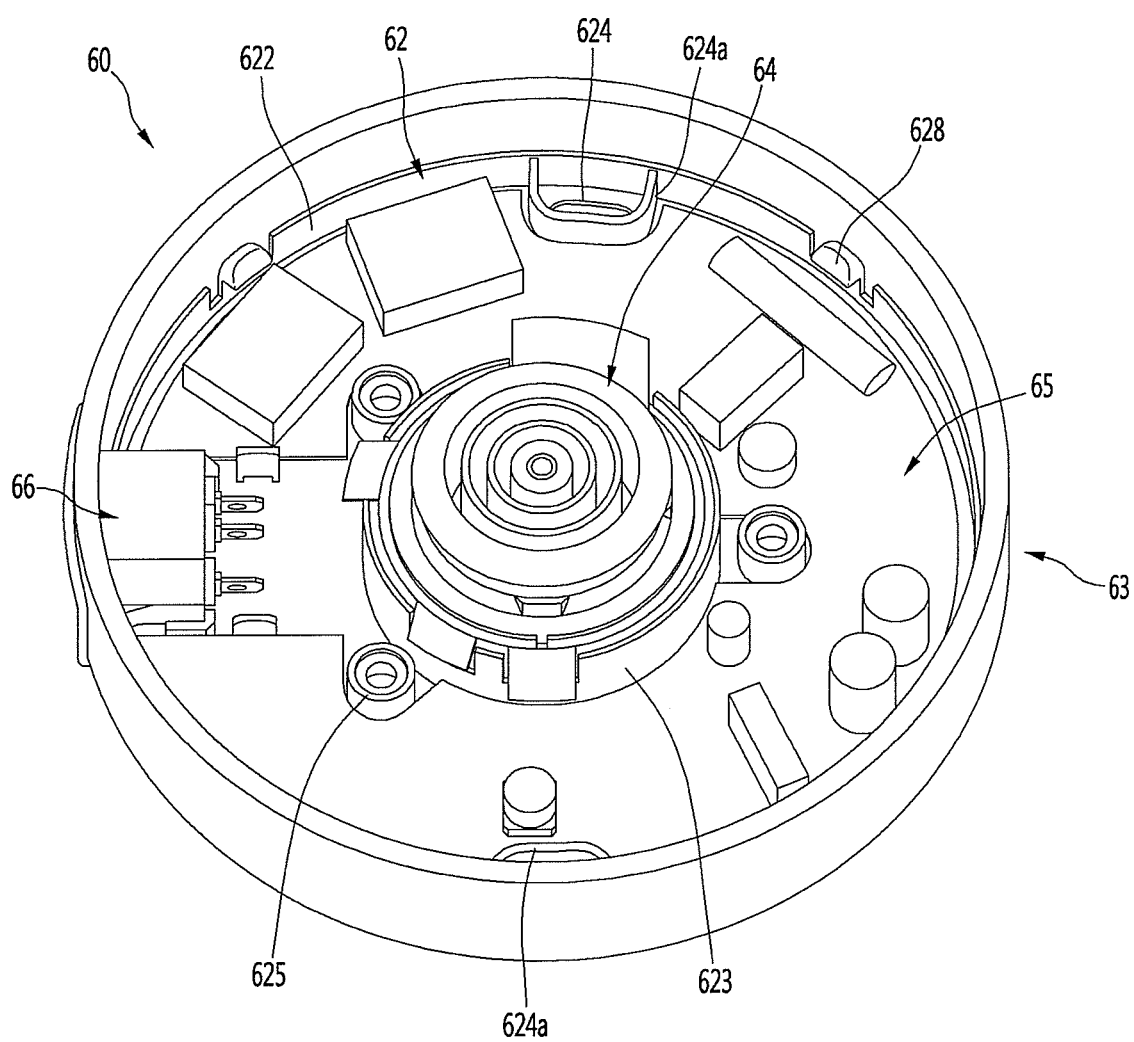
FIG. 25 is a perspective view showing a state in which a base cover of the base is removed according to an embodiment.

When the body 10 is lifted after the electropolishing is completed, as shown in FIG. 25, the electrolyte between the inner body 12 and the outer body 11 may be smoothly discharged downward through the body hole 114. In addition, even when the body 10 is washed after the electropolishing is completed, the electrolyte between the inner body 12 and the outer body 11 may be naturally discharged through the body hole 114 when the body 10 is immersed and washed in a cleaning solution and then lifted. Therefore, even when the electrolyte is removed after the electropolishing process and the body 10 is washed after the electropolishing, remaining liquids in the body 10 may be smoothly discharged.

A see-through window 13 may be formed in the body 10. The see-through window 13 allows the user to check a fluid level or boiling state of fluid in the electric kettle 1 from the outside of the electric kettle 1 without opening the lid. The see-through window 13 may extend in the vertical direction and may be fixedly mounted on each of the inner body 12 and the outer body 11. In this case, the see-through window 13 may be mounted on the body 10 in a sealed state. The see-through window 13 may include a see-through window front surface 131 exposed to the outside, a see-through window side surface 132 bent vertically along a circumference of the see-through window front surface 131, and a see-through window circumference portion 134 bent outward along an extended end of the see-through window side surface 132.

An inner mounting portion 117 and an outer mounting portion 115 for mounting the see-through window 13 may be formed in the inner body 12 and the outer body 11. The inner mounting portion 117 and the outer mounting portion 115 may be opened at positions facing each other, such that the see-through window 13 passes through the body 10 and is mounted therein.

The inner mounting portion 117 may be opened to pass through the inner body 12. The inner mounting portion 117 may be recessed in an outwardly stepped shape and may be formed along a circumference of the see-through window 13. That is, the inner mounting portion 117 extends from the inner body 12 toward the outer body 11, and the extended end thereof may be bent inward to form an opening in which the see-through window 13 may be mounted. The see-through window circumference portion 134 bent outward along the circumference of the see-through window 13 may be disposed in the stepped circumference of the inner mounting portion 117.

A see-through window gasket 135 may be mounted between the inner mounting portion 117 and the see-through window circumference portion 134. The see-through window gasket 135 may be sealed between the inner mounting portion 127 and the see-through window circumference portion 134 to prevent leakage of fluid inside of the inner body 12. The see-through window gasket 135 may be formed in a shape corresponding to the see-through window circumference portion 134 and the inner mounting portion 117. The see-through window gasket 135 may be inserted along the open end of the inner mounting portion 117 to maintain a state of being fixedly mounted on the inner mounting portion 117.

When the see-through window gasket 135 and the see-through window circumference portion 134 are seated on the inner mounting portion 117, the see-through window circumference portion 134 and the inner surface of the inner body 12 may be coplanar. Therefore, as portions protruding inward from the inner body 12 are not formed in a state in which the see-through window 13 is fixedly mounted on the body 10, the internal structure is simple and easy to clean.

The outer mounting portion 115 may be opened to pass through the outer body 11 and may be opened in a shape corresponding to the see-through window front surface 131. The outer mounting portion 115 may be bent toward the inner body 12. Therefore, the outer mounting portion 115 may support the see-through window side surface 132 in a close contact state. In this case, the see-through window front surface 131 and the outer body 11 may be coplanar. Therefore, the outer surfaces of the see-through window 13 and the outer body 11 do not protrude or are not recessed in a state in which the see-through window 13 is mounted, thereby further improving the appearance.

In addition, the see-through window 13 may be in close contact with a circumference of the outer mounting portion 115 in a mounted state and sealed by the inner mounting portion 117 and the see-through window gasket 135, thereby preventing fluid from leaking from the body 10. If necessary, an additional gasket may be further provided along the outer mounting portion 115. As the additional gasket further seals a gap between the outer mounting portion 115 and the see-through window 13, no gap occurs between the outer body 11 and the see-through window 13.

Hereinafter, the heating module 50 will be described with reference to the accompanying drawings.

Figure 16:
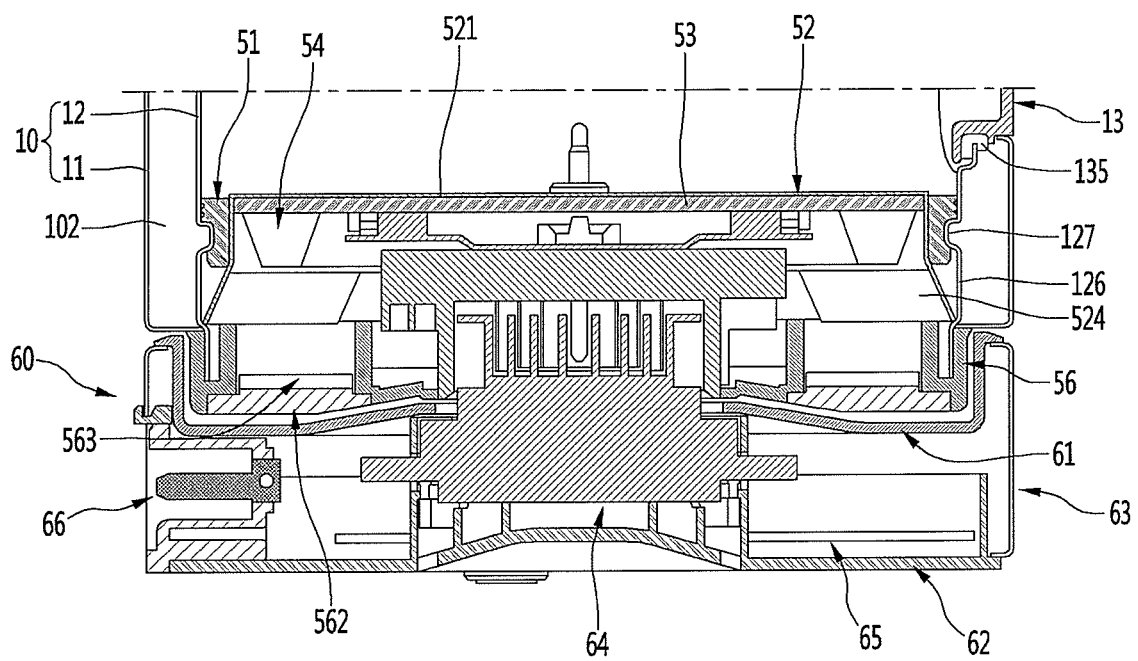
FIG. 16 is a cross-sectional view showing a state in which the body is seated on a base which is one component of the electric kettle of FIG. 1.

FIG. 16 is a cross-sectional view showing a state in which the body is seated on a base which is one component of the electric kettle of FIG. 1. As shown in FIG. 16, the heating module 50 may be mounted below the body 10. The heating module 50 may cover the open lower surface of the body 10 and forms the bottom surface of the heating space 101 provided in the body 10. The heating module 50 may form the appearance of the lower surface of the body 10 in a state in which the heating module 50 is mounted.

The heating module 50 may include heating plate 52 forming the bottom surface of the heating space 101, plate packing 51 that seals a gap between the heating module 50 and the inner body 12 around the heating plate 52, heater 54 that heats the heating plate 52, and upper power module 55 that supplies power to the heater 54. The heating module 50 may further include a bottom cover 56 that covers the remaining components except for a portion of the upper power module 55 so as not to be exposed to the lower side of the body 10.

As the heating module 50 and the bottom cover 56 are mounted through the open lower surface of the body 10 and form at least a portion of the lower portion of the body 10, the heating module 50 and the bottom cover 56 may also be referred to as a "bottom body". The body 10 may be seated on the base 60 in a state in which the bottom body is completely assembled. That is, in order to operate the electric kettle 1, the body 10 in which the bottom body is assembled must be seated on the base 60.

In a state in which the body 10 is seated on the base 60, the upper power module 55 of the body 10 and the lower power module 64 of the base 60 are in contact with each other, thereby enabling power to be supplied. In this state, the heater 54 may be heated by the supply of power to boil fluid, such as water.

Figure 17:
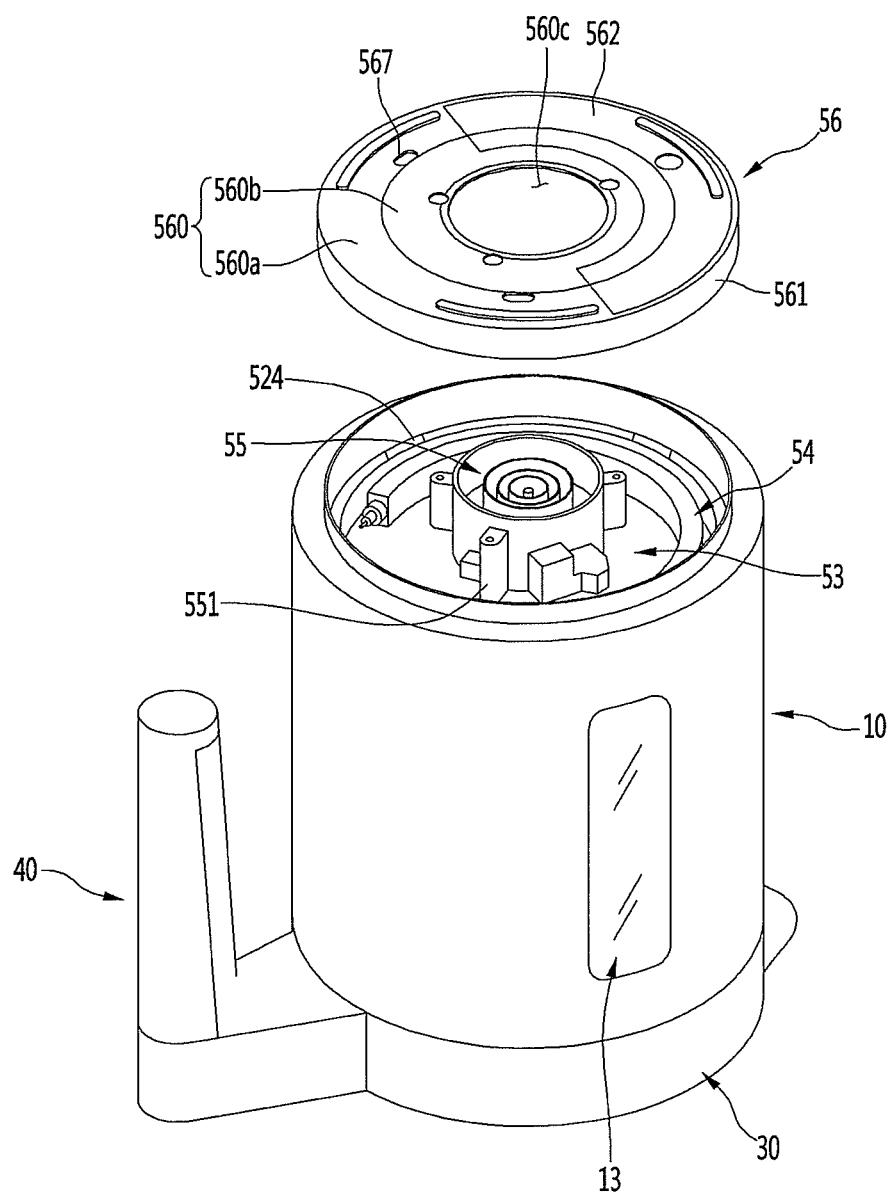
FIG. 17 is an exploded perspective view showing a state in which a bottom cover of the electric kettle of FIG. 1 is separated, when viewed from below.
Figure 18:
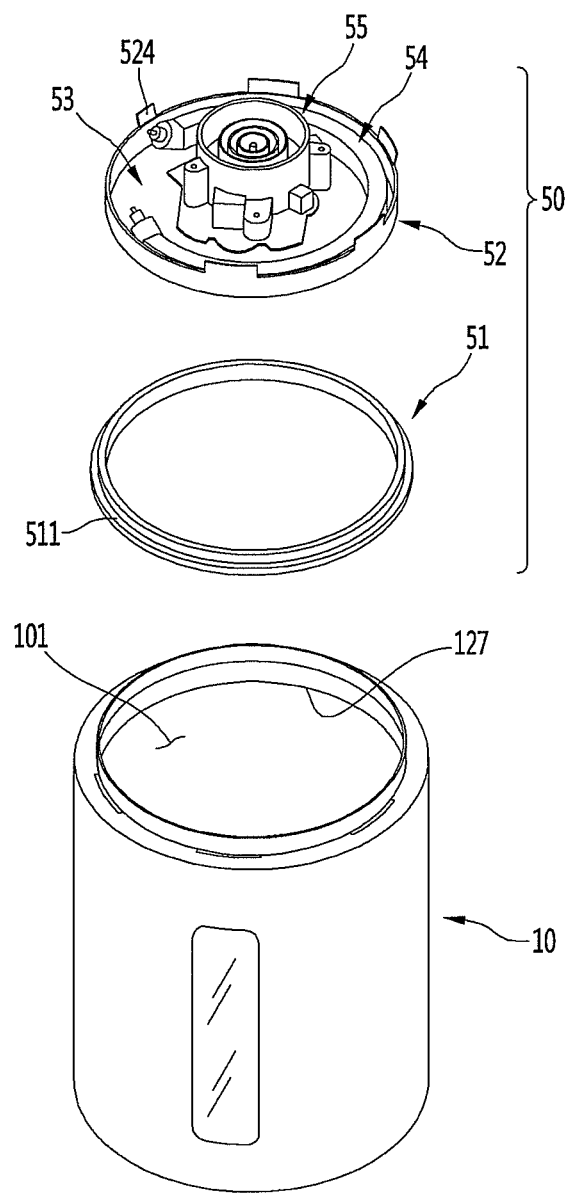
FIG. 18 is an exploded perspective view showing a connecting structure of the body and a heating module which is one component of the electric kettle of FIG. 1.
Figure 19:
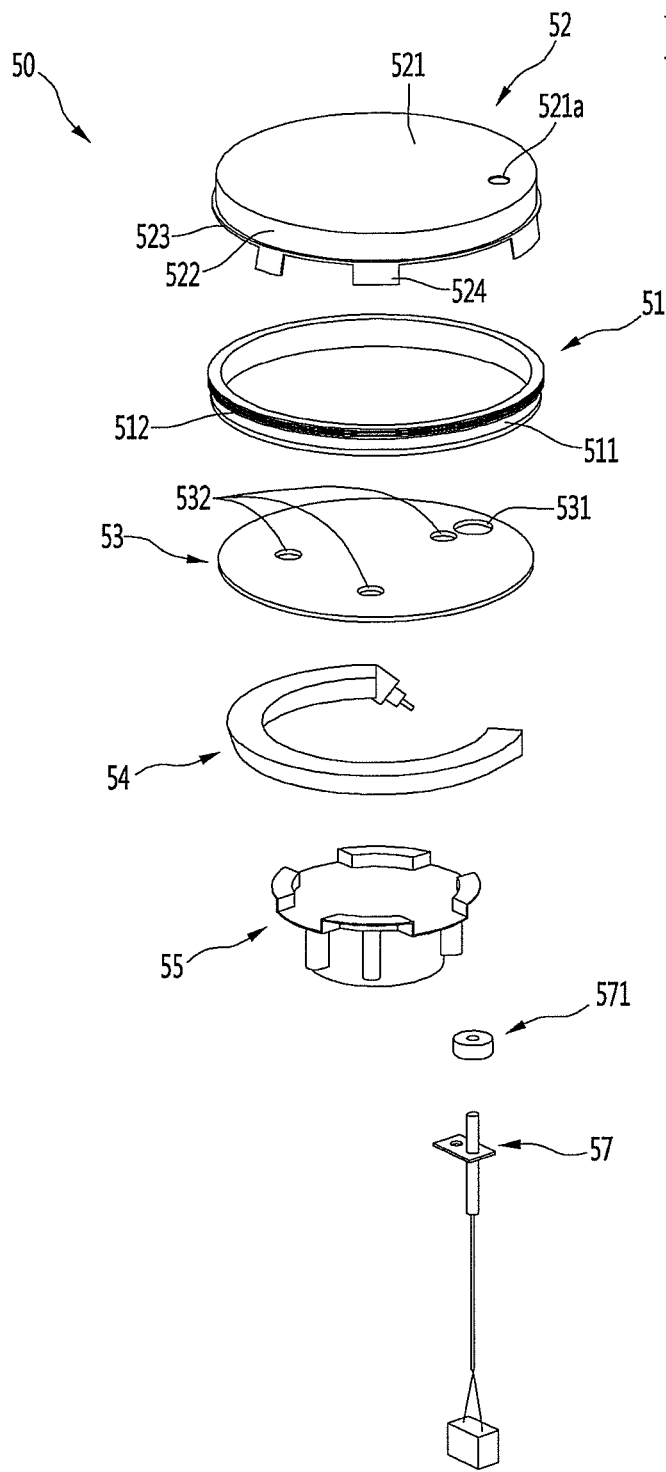
FIG. 19 is an exploded perspective view of a heating module according to an embodiment.

FIG. 17 is an exploded perspective view showing a state in which the bottom cover of the electric kettle of FIG. 1 is separated, when viewed from below. FIG. 18 is an exploded perspective view showing a connecting structure of the body and a heating module which is one component of the electric kettle of FIG. 1. FIG. 19 is an exploded perspective view of the heating module according to an embodiment.

As shown, the heating module 50 may be disposed inside of the open lower surface of the body 10. When the heating module 50 is separate from the bottom cover 56, the remaining components may be exposed through the open lower surface of the body 10.

The upper power module 55 may be disposed at a center of the open lower surface of the body 10, and the heater 54 may be provided outside of the upper power module 55 to heat the heating plate 52. The bottom cover 56 may be provided with a cover PCB 563 that supplies power to the heater 54.

The upper power module 55 may be disposed at a center of the heating module 50. The upper power module 55 may be mounted at a center of the heater base 53. The heater base 53 may be connected to a lower surface of the heating plate 52, and the heater 54 may be mounted on the heater base 53.

The heater 54 may be a sheath heater. The heater 54 may be disposed at a more outer side than the upper power module 55 and disposed along a circumference of the heating plate 52. Both ends of the heater 54 may be spaced apart from each other at adjacent positions, and a connection terminal 763c may be exposed at both ends of the heater spaced apart from each other and may be connected to the cover PCB 563 by an electric wire.

The heater 54 may be mounted on the heater base 53. The heater base 53 may be formed in a disk shape having a size corresponding to a size of the lower surface of the heating plate 52, and the heater 54 may be mounted on the heater base 53. The heater base 53 may be made of aluminum or an aluminum alloy material having high thermal conductivity, for example, such that heat of the heater 54 may be uniformly transferred to an entire plate portion 521 of the heating plate 52. The heater base 53 and the heater 54 may be integrally formed by die casting, for example.

A cover coupling hole 532 to mount the bottom cover 56 may be formed in the heater base 53, and a screw that passes through the bottom cover 56 may be coupled to the cover coupling hole 532 of the heater base 53. A temperature sensor mounting hole 531 in which the temperature sensor 57 may be mounted may be further formed in the heater base 53.

The heater base 53 may be mounted on the lower surface of the heating plate 52. In this case, the heater base 53 may be in close contact with the lower surface of the heating plate 52, and may be blazing-processed, for example, to be integrally connected to the heating plate 52 so as to effectively transfer heat.

The heating plate 52 may form the bottom surface of the heating space 101, and at a same time, the heating module 50 may be fixedly mounted on the inside of the body 10. The heating plate 52 may be made of a same stainless steel as the inner body 12 and may be inserted and mounted into the open lower portion of the inner body 12 in a state of being connected to the heater base 53.

The heating plate 52 may be fixedly mounted on one or a first side of the lower portion of the inner body 12 and may form a space in which the heater base 53, the heater 54, and the upper power module 55 may be disposed. The heating plate 52 may include plate portion 521 forming the bottom surface of the heating space 101 inside of the inner body 12, a plate rim 522 on which the plate packing 51 may be mounted around the plate portion 521, and a support 524.

The plate portion 521 may be formed in a circular shape and may have a diameter slightly smaller than the inner diameter of the inner body 12. Upper and lower surfaces of the plate portion 521 may have a planar structure, and the heater base 53 may be mounted on the lower surface of the plate portion 521. A size of the plate portion 521 may be equal to a size of the heater base 53. Therefore, when the heater base 53 generates heat, the heater base 53 may heat the entire plate portion 521, such that the entire bottom surface of the inside of the heating space 101 is heated.

A through hole 521a may be formed at one or a first side of the plate portion 521. The through hole 521a may be opened at a position corresponding to the temperature sensor mounting hole 531, and the temperature sensor 57 may be fixedly mounted in the through hole 521a. In this case, a sensor packing 571 may be provided around the temperature sensor 57, and the sensor packing 571 may be mounted in the through hole 521a to seal the through hole 521a. The temperature sensor 57 is exposed above the plate portion 521 to sense the temperature of fluid contained in the heating space 101.

Plate rim 522 may be formed along a circumference of the plate portion 521. The plate rim 522 may be vertically bent downward from the circumference of the plate portion 521. A height of the plate rim 522 may correspond to a vertical height of the plate packing 51, and a bent portion 523 bent outward may be formed at a lower end of the plate rim 522 to allow the plate packing 51 to be seated on the plate rim 522.

The plate packing 51 may be mounted on the plate rim 522 and may be formed along the circumference of the plate portion 521. The plate packing 51 may seal a gap between the inner body 12 and the plate portion 521. The plate packing 51 may be inserted into the inner body 12 in a state of being mounted on the plate rim 522 and may be coupled to the packing mounting portion 127 of the inner body 12. Therefore, the heating plate 52 may be fixed to the inside of the inner body 12 by the plate packing 51, and at the same time, fluid may be prevented from leaking between the heating plate 52 and the inner body 12.

The plate packing 51 may have packing groove 511 recessed in a shape corresponding to the packing mounting portion 127. The packing groove 511 may be formed along an outer surface of the plate packing 51, and the packing mounting portion 127 may be inserted into the packing groove 511 to fix the plate packing 51 and the heating plate 52 connected to the plate packing 51.

A sealing portion 512 may be further formed above the packing groove 511. The sealing portion 512 may be formed over the upper end of the plate packing 51 at the upper end of the packing groove 511. The sealing portion 512 may be configured such that a plurality of protrusions or ribs protrude along the circumference of the plate packing 51, and may be in contact with the inner surface of the inner body 12. The sealing portion 512 may seal a gap between the inner body 12 and the plate packing. The sealing portion 512 may protrude more outward than the packing groove 511 to form a stepped portion and may have a structure seated on the upper end of the packing mounting portion 127.

The bent portion 523 at the lower end of the plate rim 522 may be formed in a shape slightly stepped from the plate rim 522 and may maintain a state in which the plate packing 51 is seated. A plurality of supports 524 may be formed at the lower end of the plate rim 522. The plurality of supports 524 may be arranged at regular intervals and may be arranged along the circumference of the plate rim 522.

The support 524 may extend downward. The support 524 may be formed to be slanted outward as the support 524 extends downward. Each of the supports 524 may be formed in a plate shape, and thus, may be elastically deformed when a force is applied toward a center of the heating plate 52.

An extended end of the support 524 may extend to be supported to the lower end of the plate mounting portion 126. A lower end of the support 524 may extend to be slanted more toward the outer side than the outer diameter of the inner lower end portion 125. Therefore, in a process of inserting the heating plate 52, the support 524 may be pressed in contact with the inner surface of the inner lower end portion 125 while passing through the inner lower end portion 125 and may be elastically deformed toward the inner side.

Figure 23:
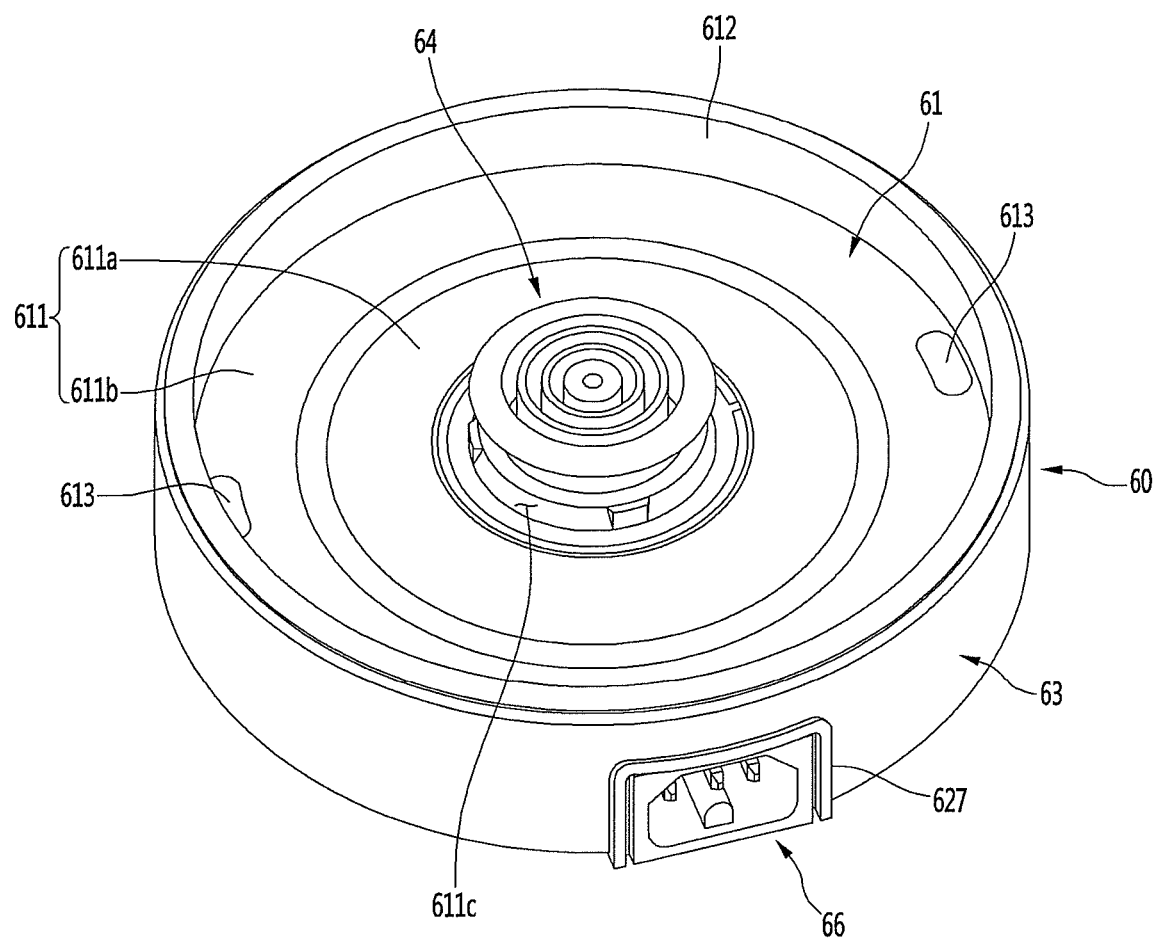
FIG. 23 is a perspective view of a base which is one component of the electric kettle of FIG. 1, when viewed from above.

When the heating plate 52 and the plate packing 51 are inserted up to the plate rim 522, the support 524 is restored in an outward direction while passing through the inner lower end portion 125, as shown in FIG. 23, and the lower end of the support 524 is caught and restrained by a lower edge of the plate mounting portion 126 at the inside of the plate mounting portion 126. Therefore, the heating plate 52 may maintain the mounted state and may maintain a firmly connected state without moving downward to be arbitrarily separated or generating a gap.

The remaining heating module 50 except for the bottom cover 56 may be completely accommodated inside of the body 10. When the bottom cover 56 is mounted, the remaining components of the heating module 50 provided inside of the body 10 are covered and the appearance of the lower surface of the body 10 may be formed.

A cover hole 560*c* may be formed at a center of the bottom cover 56, and portion of the upper power module 55 may be exposed through the cover hole 560*c*. The bottom cover 56 may be provided with a cover plate 562 to open and close a portion of the bottom cover 56.

Figure 20:
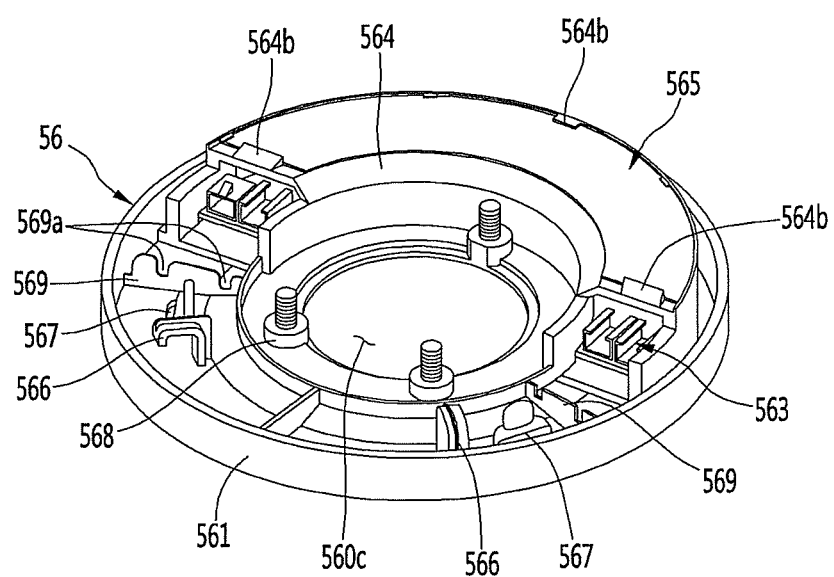
FIG. 20 is a perspective view of the bottom cover according to an embodiment.
Figure 21:
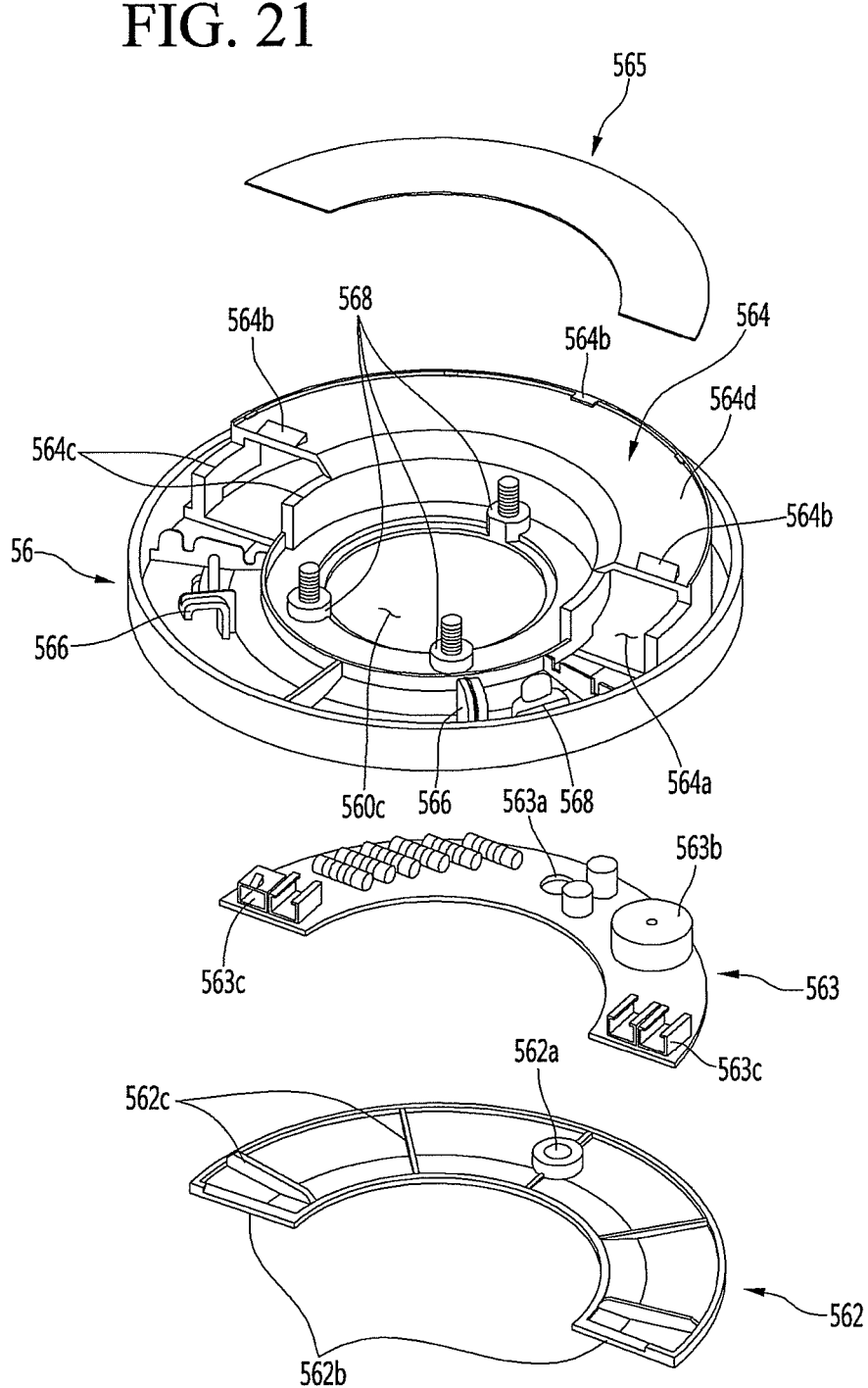
FIG. 21 is an exploded perspective view of the bottom cover of FIG. 27, when viewed from above.
Figure 22:
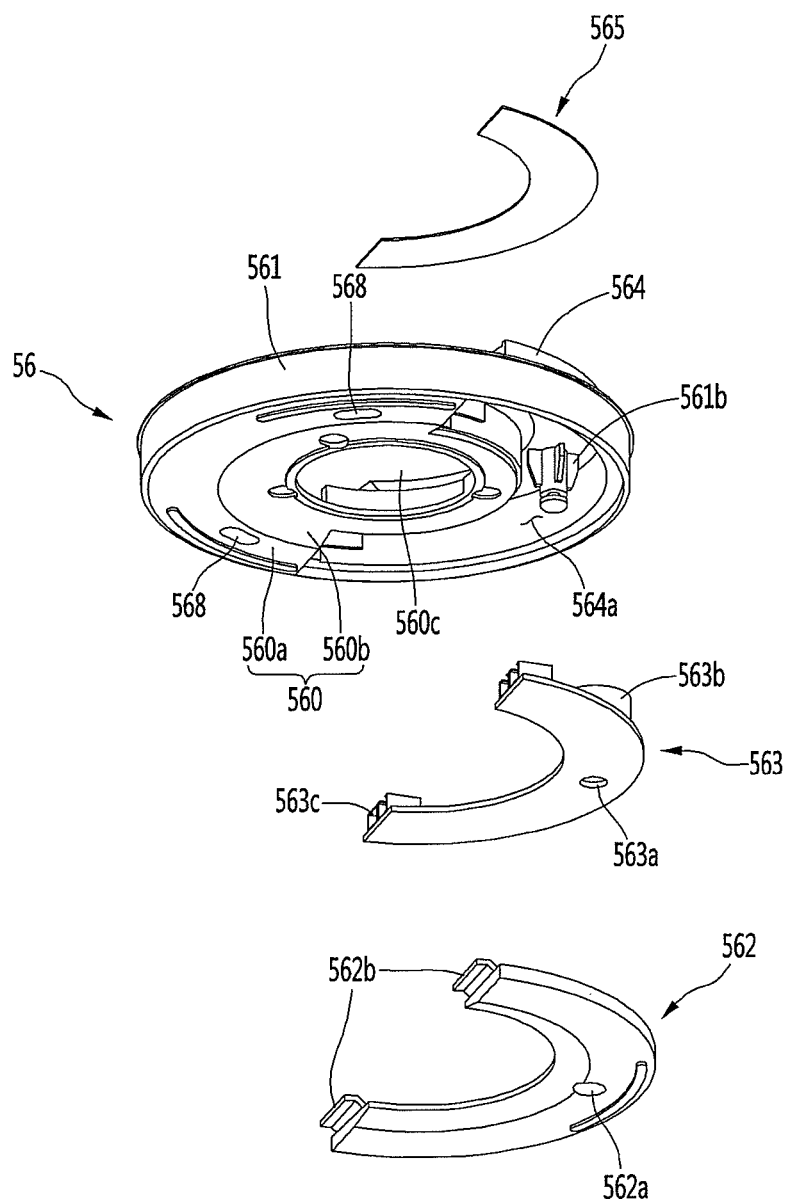
FIG. 22 is an exploded perspective view of the bottom cover of FIG. 27, when viewed from below.

FIG. 20 is a perspective view of the bottom cover according to an embodiment. FIG. 21 is an exploded perspective view of the bottom cover of FIG. 20, when viewed from above. FIG. 22 is an exploded perspective view of the bottom cover of FIG. 20, when viewed from below.

As shown in FIGS. 20 to 22, the bottom cover 56 may be injection-molded of a plastic material, for example, and may be connected to the lower end of the body 10 to cover the open lower surface of the body 10 and at a same time form the appearance of the lower surface of the body 10. The bottom cover 56 may include a cover bottom surface 560 and a cover rim 561 bent along a circumference of the cover bottom surface 560. The cover bottom surface 560 may include a cover slant portion 560*a* in the center of the cover bottom surface 560, and a cover flat portion 560*b* outside of the cover slant portion 560*a*. The cover slant portion 560*a* may have a slant which decreases from the center toward the outside, and the cover flat portion 560*b* formed up to the cover rim 561 in parallel to the ground may be formed at an outer end of the cover slant portion 560*a*.

A cover hole 560*c* may be formed at the center of the cover bottom surface 560, that is, at a center of the cover slant portion 560*a*, and the upper power module 55 may be exposed through the upper module hole 560*c*. Therefore, when the body 10 is mounted on the base 60, the body 10 may be in contact with the lower power module 64.

The bottom cover 56 may cover all components of the heating module 50 except for the upper power module 55. A plurality of screw holes 568, to which screws may be coupled, may be formed along a circumference of the upper module hole 560*c*. The screw hole 568 may be formed at a position corresponding to the coupling hole 532 of the heater base 53. Therefore, the screw may pass through the screw hole 568 and be coupled to the coupling hole 532, such that the bottom cover 56 may be firmly fixed to the body 10.

The cover rim 561 may be formed around the bottom surface 560 of the bottom cover 56. The cover rim 561 may extend upward along the circumference of the bottom cover 56 and may cover the inner lower end portion 125 from the outside. Therefore, when the bottom cover 56 is connected, the cover rim 561 may cover the inner lower end portion 125 from the outside. In this case, an inner surface of the cover rim 561 and the outer surface of the inner lower end portion 125 may be in close contact with each other such that the bottom cover 56 may maintain a stable and firm connected state.

A plurality of bottom ribs 569 that extends radially around the upper module hole 560*c* may be formed inside of the bottom cover 56. The plurality of bottom ribs 569 may serve as a partition wall to reinforce a strength of the bottom cover 56 and block fluid from flowing into the cover PCB 563 when fluid leakage occurs.

An electric wire groove 569*a* may be recessed in the bottom ribs 569 such that the electric wires may be guided through the bottom ribs 569 to the cover PCB 563. In addition, a plurality of electric wire fixing portions 566, which is formed in a ring shape so as to fix the electric wires, may be formed between the plurality of bottom ribs 569.

A central portion of the bottom cover 56, in which the upper power module 55 may be positioned, may be formed to be slightly high. The cover slant portion 560*a* may be formed to have a slant which decreases toward the outside, thereby preventing fluid from flowing into the upper power module 55 in the case of a fluid leakage situation.

A cover drain hole 567 may be formed in the cover flat portion 560b of the bottom cover 56. The cover drain hole 567 may be positioned outside of the bottom cover 56 having a relatively low height and may pass through the cover bottom surface 560 of the bottom cover 56. Therefore, fluid introduced into the bottom cover 56 may flow outward along the cover slant portion 560a and be discharged downward through the cover drain hole 567, thereby preventing the fluid from accumulating inside of the bottom cover 56. Therefore, the upper power module 55 and the cover PCB 563 provided in the bottom cover 56 may be protected from leakage.

The bottom cover 56 may be provided with a PCB accommodating portion 564. The PCB accommodating portion 564 may form a space in which the cover PCB 563 may be accommodated and may be formed in a shape in which a lower surface and both extended ends are open. The PCB accommodating portion 564 may be disposed over a half region of the bottom cover 56.

That is, the PCB accommodating portion 564 may be positioned on one side of both sides with respect to the center of the bottom cover 56 and may be positioned below the heater 54. A space in which the electric wires connected to the cover PCB 563, the upper power module 55, and the heater 54 are disposed may be provided at one side of the bottom cover 56 opposite to a position at which the PCB accommodating portion 564 is formed. The cover drain hole 567, the bottom rib 569, and the electric wire fixing portion 566 may also be disposed at a position opposite to the position of the PCB accommodating portion 564.

The PCB accommodating portion 564 may be formed along an accommodating portion opening 564a of the bottom of the bottom cover 56 and may be formed along the circumference of the bottom cover 56. The PCB accommodating portion 564 may have a predetermined height so as to accommodate the cover PCB 563.

Both ends of the PCB accommodating portion 564 may be open toward the inner side of the bottom cover 56. A terminal 563c, to which the electric wire may be connected, may be provided at an end of the cover PCB 563 exposed through the opening.

The PCB accommodating portion 564 may include a side surface portion 564c that extends vertically along an inner edge and an outer edge of the accommodating portion opening 564a, and an upper surface portion 564d connecting both ends of the side surface portion 564c. As a mica sheet 565 may be mounted on the upper surface portion 564d, the upper surface portion 564d may be referred to as a "sheet mounting portion 564d".

The mica sheet 565 may be formed to have a size and a shape corresponding to those of the cover PCB 563 and be disposed on the upper surface of the sheet mounting portion 564d. Therefore, the cover PCB 563 may be thermally and electrically insulated such that the cover PCB 563 is protected from abnormal operations.

Sheet fixing portions 564b may be formed in the sheet mounting portion 564d so as to fix the mica sheet 565. The sheet fixing portions 564b may be formed at both ends of the sheet mounting portion 564d, and an additional sheet fixing portion 564b may be further formed between the sheet fixing portions 564b on both sides. The sheet fixing portions 564b may restrain an end of the mica sheet 565 such that the mica sheet 565 maintains a state of being mounted on the sheet mounting portion 564d.

The cover PCB 563 may be provided inside of the PCB accommodating portion 564 and may have a shape corresponding to the accommodating portion opening 564a. The cover PCB 563 may be mounted on the cover plate 562 that covers the accommodating portion opening 564a.

The cover PCB 563 may be connected to the heater 54 and the upper power module 55 and may be configured to supply power to the heater 54. The cover PCB 563 may be connected to the handle PCB 43 provided in the handle cover 32 such that operation of the heater 54 is controlled by operation of the operation portion 323.

The cover PCB 563 may be provided with a buzzer 563b. When it is necessary to notify operation of the electric kettle 1, the buzzer 563b may notify a state by outputting a beep sound. For example, when a power is supplied by mounting the assembled body 10 on the base 60, the buzzer 563b may output a notification sound to allow the user to recognize that the electric kettle is ready to operate, without checking the display. Instead of the buzzer 563b, a speaker may be provided. The buzzer 563b may be referred to as a "sound output device".

A PCB hole 563a may penetrate through the cover PCB 563. The PCB hole 563a may be formed to have a size corresponding to that of a fixing boss 562a protruding from the cover plate 562. Therefore, when the cover PCB 563 is mounted on the cover plate 562, the fixing boss 562a may pass through the PCB hole 563a. The cover PCB 563 may maintain a state of being fixedly mounted on the cover plate 562 and may be detached together with the cover plate 562 when the cover plate 562 is detached.

The cover plate 562 may be formed in a shape corresponding to that of the accommodating portion opening 564a and may cover the accommodating portion opening 564a. The cover plate 562 may be provided with a pair of fixing ends 562b and the fixing boss 562a so as to be fixedly mounted on the bottom cover 56 in a mounted state.

The fixing boss 562a is formed at a center of the cover plate 562 and protrudes upward. A screw, which passes through the fixing boss 562a, may be coupled to a coupling portion 561b protruding downward from an inside of the PCB accommodating portion 564 to fix the cover plate 562. The fixing ends 562b may protrude from both ends of the cover plate 562 and may be inserted, caught, and restrained by both ends of the accommodating portion opening 564a when the cover plate 562 is mounted. The fixing ends 562b may protrude upward and forward from the end of the cover plate 562 to be caught and restrained by both sides of the accommodating portion opening 564a.

A plurality of support ribs 562c may protrude from the cover plate 562. The support ribs 562c may connect an inner end and an outer end of the cover plate 562, and a plurality of support ribs 562c may be radially arranged. Therefore, the cover PCB 563 may be supported from below when the cover PCB 563 is mounted, and the cover PCB 563 may maintain a stable mounted state.

In order to use the electric kettle 1 in a state in which the bottom cover 56 is mounted on the body 10, the electric kettle 1 may be seated on the base 60. When the body 10 is seated on the base 60, the upper power module 55 and the lower power module 64 may be in contact with each other and may be in a state in which power may be supplied to the heating module 50.

Hereinafter, structure of the base 60 will be described with reference to the accompanying drawings.

Figure 24:
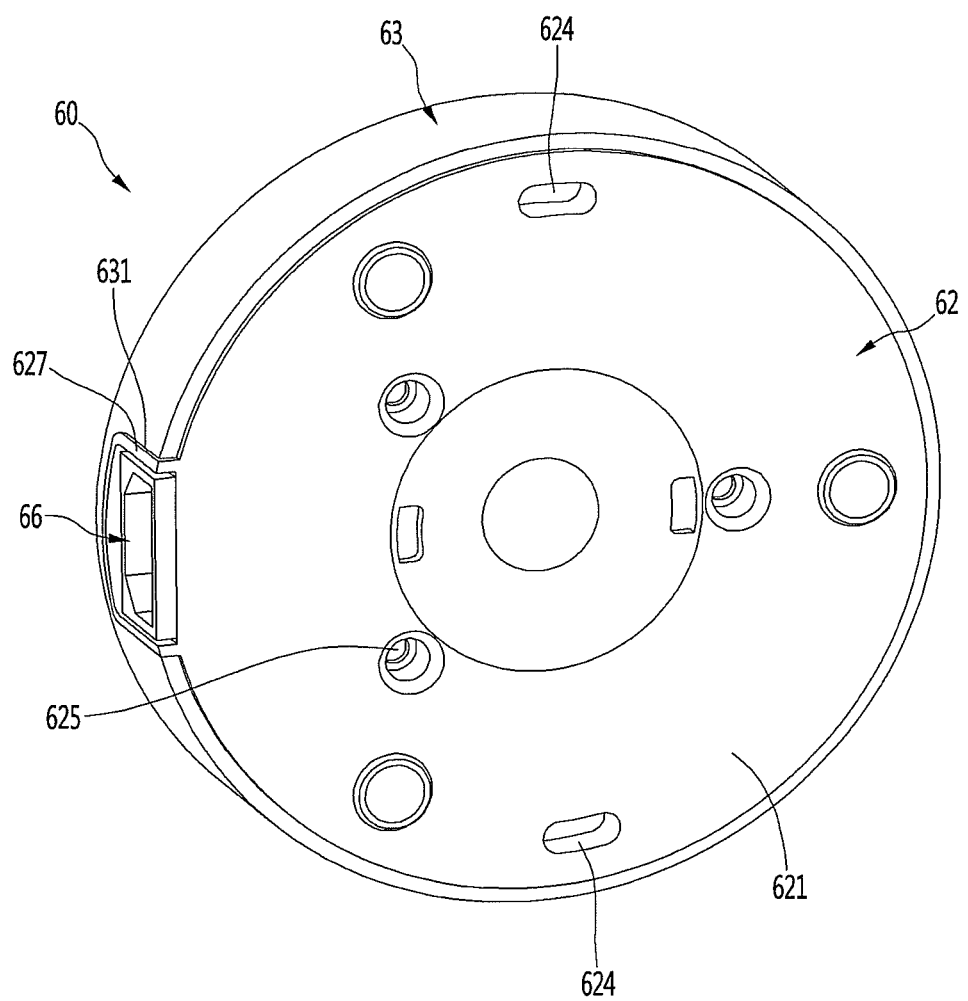
FIG. 24 is a perspective view of the base that is one component of the electric kettle of FIG. 1, when viewed from below.
Figure 26:
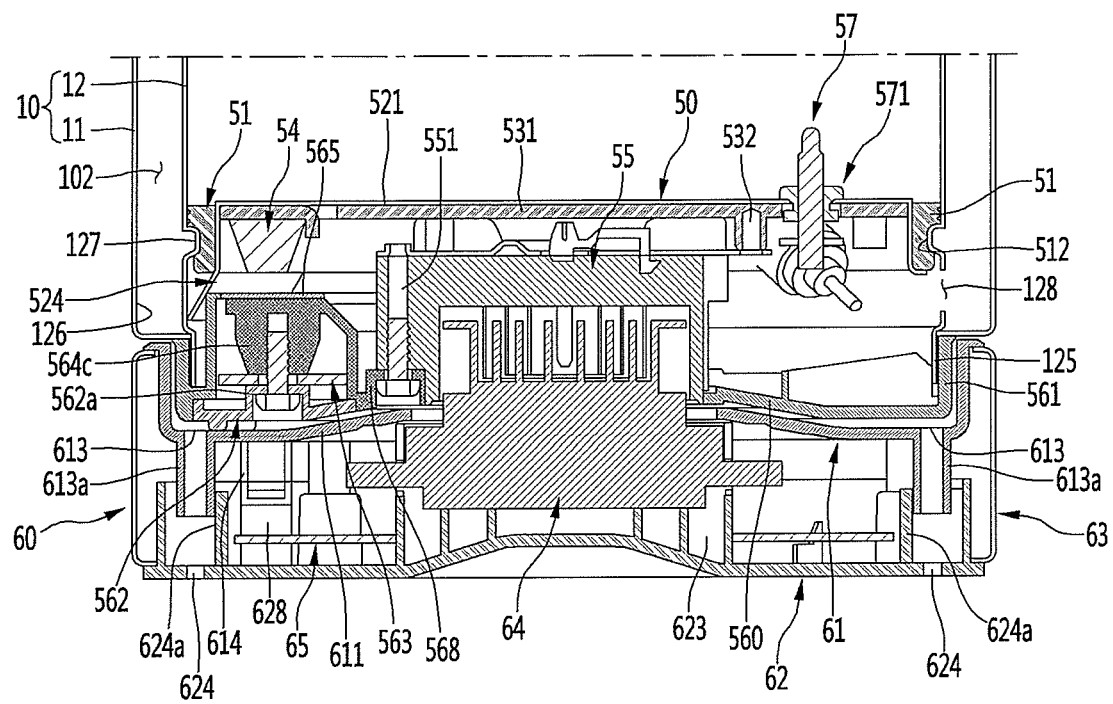
FIG. 26 is a cross-sectional view showing a mounted state of the heating module and the base according to an embodiment.

FIG. 23 is a perspective view of a base which is one component of the electric kettle of FIG. 1, when viewed from above. FIG. 24 is a perspective view of the base which is one component of the electric kettle of FIG. 1, when viewed from below. FIG. 25 is a perspective view showing a state in which a base cover of the base is removed according to an embodiment. FIG. 26 is a cross-sectional view showing a mounted state of the heating module and the base according to an embodiment.

As shown in FIGS. 23 to 26, the base 60 may be formed in a shape corresponding to a cross-sectional shape of the body 10 and may be configured to allow the body 10 to be seated on an upper surface of the base 60. Power may be supplied to the body 10 in a state in which the body 10 is seated on the base 60, and the outer surface of the body 10 and the outer surface of the base 60 may be coplanar, thereby providing a sense of unity.

An overall appearance of the base 60 may be formed by base cover 61 forming the upper surface, base body 62 forming the lower surface, and side plate 63 forming a circumferential surface between the base body 62 and the base cover 61.

The base cover 61 may have a diameter corresponding to that of the body 10 and may be formed to allow the lower surface of the body 10 to be seated. The base cover 61 may include a base upper surface 611 forming the upper surface of the base 60, and a base cover rim 612 that protrudes upward along a circumference of the base upper surface 611.

The base upper surface 611 is a portion on which the bottom cover 56 may be seated when the body 10 is mounted on the base 60, and may be formed in a shape corresponding to that of the bottom surface of the bottom cover 56. That is, a lower module hole 611c, through which the lower power module 64 may pass, may be formed at a center of the base upper surface 611. The lower power module 64 may protrude upward through the lower module hole 611c.

The base upper surface 611 may include an upper slant portion 611a and an upper flat portion 611b. The upper slant portion 611a may be slanted from the lower module hole 611c toward the outside. The upper flat portion 611b may be formed to be horizontal to the ground from the upper slant portion 611a to the base cover rim 612. Therefore, the base upper surface 611 may be formed in a shape in which a central portion from which the lower power module 64 protrudes slightly protrudes, and thus, even when fluid leakage occurs in the body 10, fluid does not flow into the lower power module 64 but flows toward the upper flat portion 611b.

An upper drain hole 613 may be formed in the upper flat portion 611b. The upper drain hole 613 is a passage for draining fluid flowing down to the base 60 under the base 60 and may be open at an outer end of the upper flat portion 611b. A plurality of upper drain holes 613 may be formed in a direction facing each other. In addition, a hole guide 613a that extends downward may be formed around the upper drain hole 613. The hole guide 613a may extend to a position adjacent to a bottom surface of the base body 62 and may guide fluid to be discharged to lower drain hole 624 described below.

The base cover rim 612 may be formed at a height equal to or slightly higher than that of the bottom cover 56. The base cover rim 612 may support the outer lower end portion 113 when the body 10 is mounted.

The base body 62 may include a base bottom surface 621 formed in a disk shape having a size corresponding to that of the base cover 61, and a base rim 622 bent upward along a circumference of the base bottom surface 621. A center of the base body 62 may protrude upward, and a power module mounting portion 623 on which the lower power module 64 may be mounted may be formed at the protruded central portion. The lower power module 64 may be disposed at a position corresponding to the upper power module 55 and may protrude upward through the lower module hole 611c.

Therefore, when the body 10 is seated on the base 60, the upper power module 55 and the lower power module 64 may be in contact with each other to thereby be capable of supplying power.

A plurality of base coupling bosses 625 may be formed outside of the power module mounting portion 623. The plurality of base coupling bosses 625 may be spaced apart from the power module mounting portion 623. The base coupling boss 625 may protrude upward and may extend through the base PCB 65 inside of the base body 62. Screws may be coupled to the base coupling bosses 625, and the screws may be coupled to the base cover 61 by passing through the base coupling bosses 625. Therefore, the base body 62 and the base cover 61 may be firmly connected to each other by the screws.

The base PCB 65 may be mounted along a space between the power module mounting portion 623 and the base rim 622 and may be formed in a corresponding shape. The base PCB 65 may be connected to the lower power module 64 and a power connector 66 described hereinafter and may be configured to control operation and power supply of the lower power module 64.

A lower drain hole 624 may be formed in the base bottom surface 621 adjacent to the base rim 622. The lower drain hole 624 may be formed at a position corresponding to the upper drain hole 613. A partition wall 624a that extends upward may be formed in a circumference of the lower drain hole 624. The lower drain hole 624 may be a passage through which the fluid flowing down through the upper drain hole 613 and the hole guide 613a may be discharged to the outside of the base 60 and may pass through the base bottom surface 621. The partition wall 624a forms a space partitioned such that fluid flowing toward the lower drain hole 624 does not overflow to the outside, and a lower end of the hole guide 613a is accommodated inside of the partition wall 624a. The partition wall 624a may be formed to be higher than a lower end of the hole guide 613a and may be connected to the base rim 622. A plurality of lower drain holes 624 and a plurality of partition walls 624a may be formed spaced apart from each other.

In addition, a base hook 628 may be formed at one or a first side of the base rim 622. The base hook 628 may be formed by cutting out a portion of the base rim 622 and may extend upward. An end of the base hook 628 may be caught and coupled to a base connecting portion of the base cover 61. The base body 62 and the base cover 61 may maintain a connected state by connection of the base hook 628 and the base connecting portion 614. A plurality of base hooks 628 may be formed along the base rim 622, and thus, a circumferential surface of the base 60 may maintain a firm connected state.

A connector mounting portion 627, to which the power connector 66 may be connected, may be formed at one or a first side of the base body 62. The power connector 66 may be a portion connected to an end of a power cable including a plug connected to an outlet and may be formed such that the power cable is detachable. The power connector 66 may be exposed to the side of the base 60 and may be mounted on the connector mounting portion 627.

The connector mounting portion 627 may be opened to allow the power connector 66 to be inserted thereinto, and the portion opened through the opening of the side plate 63 may be exposed to the outside. The open end of the connector mounting portion 627 may protrude more than an end of the power connector 66 and may be formed in a shape protruding from the side plate 63. Therefore, when fluid overflows or flows down to the base 60, the fluid may be blocked from flowing into the side plate 63.

The side plate 63 connects the base body 62 to the base cover 61 and may form a side circumference of the base 60. The side plate 63 may be made of a same metal material as that of the body 10, and the side plate 63 and the body 10 may have a sense of unity in a state in which the body 10 is mounted on the base 60.

Upper and lower ends of the side plate 63 may be bent, and the ends of the base body 62 and the base cover 61 may be supported. A side opening 631, which is cut to expose the connector mounting portion 627, may be formed in the side plate 63.

Hereinafter, operation of the electric kettle having the above-mentioned structure according to an embodiment will be described.

In order to use the electric kettle 1, the user may connect the power supply by inserting the power cable connected to the base 60 into the outlet. In this state, fluid, such as water may be filled in the heating space 101 inside of the body 10, and the body 10 may be placed on the base 60.

When the body 10 is seated on the base 60, the upper power module 55 and the lower power module 64 are in contact with each other and are in a state in which power may be supplied from the base 60 to the body 10. The buzzer 563b may output a notification sound when the body 10 is seated on the base 60, and the notification sound of the buzzer 563b makes it possible for the user to recognize that the body 10 is normally seated on the base 60 and is in an operable state.

Next, the user may start heating of the heater 54 by operating the operation portion 323 of the handle 40. At this time, the user may check a set temperature through the display 322, and may operate the operation portion 323 to start heating a fluid, such as water contained in the heating space 101.

The operation of the heater 54 may be started according to the operation of the operation portion 323, and the fluid contained in the heating space 101 may be heated by heat of the heater 54. When the temperature sensor 57 senses that the fluid inside of the heating space 101 reaches the set temperature, the heater 54 stops operating and the electric kettle 1 completes the operation.

When the operation of the electric kettle 1 is completed, the buzzer 563b may output a beep sound notifying the completion of the operation. The user may hold the handle 40 and lift the body 10 to separate the base 60, and may tilt the electric kettle 1 to pour the heated fluid through the spout 311.

The electric kettle 1 may reduce or block heat conduction by the double structure of the body 10 in a state in which the heating of the fluid is completed. Therefore, even when the user comes into contact with the outer surface of the body 10, safety of the user may be secured because the outer surface of the body 10 is not excessively hot. Even when the heater 54 is not in operation, the temperature of the heated water may be maintained for a long time.

The electric kettle according to embodiments disclosed herein has at least the following advantages.

In the electric kettle according to embodiments disclosed herein, the stainless steel body has the double structure of the inner body and the outer body. The heat insulation space may be formed between the inner body and the outer body. Therefore, it is possible to minimize heat generated during the heating of fluid to outside of the body and ensure a safety of the user. Also, the fluid heated inside of the body may be insulated by the structure of the body to maintain the heated temperature, and unnecessary reheating may be prevented by maintaining the temperature, thereby reducing power consumption.

The body may be formed in the cylindrical shape in which the upper end and the lower end have a same diameter, and the body and the upper body mounted on the upper end of the body may be formed to have a same outer diameter and inner diameter. Therefore, an inside of the body may be easily cleaned and the inside may be easily checked, thereby facilitating management.

The handle may protrude from one side of the body, and the PCB for controlling the heating module may be provided inside of the handle. As the PCB inside of the handle is connected to the heating module by the electric wire and the electric wire passes through the heat insulation space of the body, the separate electric wire arrangement structure may be omitted, thereby providing a more simple structure and improving assembly workability and work productivity.

The plurality of body holes may be formed along the circumference of the lower end of the body. When electropolishing process is performed in a state in which the outer body and the inner body are connected in the double wall structure, the electropolishing solution and a cleaning solution may be easily discharged through the body holes. Therefore, the electropolishing process and post-processing may be performed more smoothly and faster.

In particular, the body hole may be formed at a position corresponding to the bottom surface of the heat insulation space, and the plurality of body holes may be disposed along the circumference of the lower surface of the body, such that the electropolishing solution and the cleaning solution may be discharged very smoothly. Therefore, the work may be rapidly performed and additional post-processing may be omitted, thereby significantly improving productivity.

The handle may be provided with the operation portion configured to adjust operation of the heating module and the display configured to display the temperature of the heated fluid. Therefore, the user may move the electric kettle by holding the handle with one hand, and it is easy to start and stop heating and control the temperature, thereby improving ease of use.

The body hole may be formed at the lower end of the body, and the body hole may be covered by the bottom cover that forms the lower surface of the body. Therefore, the body hole may not be exposed to the outside, and the appearance may be more neatly seen.

The body, the upper body, and the base may be configured to have the same outer diameter, and thus, there is an advantage of a cylindrical appearance structure having a sense of unity as a whole. In particular, the body and the upper body may be made of a same metal material and the outer surface of the base also made of the same metal material, further enhancing the sense of unity of the overall appearance. In addition, the body, the upper body, and the base are coplanar, and in particular, the heating module is disposed inside of the body. Therefore, it is possible to minimize exposure of the configuration that may feel a heterogeneity when the body is directly seated on the base, thereby further improving the sense of unity of the overall appearance.

Embodiments disclosed herein provide an electric kettle capable of improving heat insulation performance and reducing power consumption. Embodiments disclosed herein also provide an electric kettle capable of improving assembly workability and work productivity. Embodiments disclosed herein further provide an electric kettle having a structure that facilitates arrangement of electric wires and electropolishing.

Embodiments disclosed herein provide an electric kettle capable of improving ease of use. Embodiments disclosed herein additionally provide an electric kettle having an appearance with the sense of unity to thereby improve the appearance.

In embodiments disclosed herein, a body may be formed in a double wall structure by an outer body and an inner body made of stainless steel, and a heat insulation space may be formed between the outer body and the inner body. A body hole that communicates with the heat insulation space may be open at a lower end of the body.

The body may be provided with an electric wire outlet that communicates with a handle at the upper portion of the body, and an electric wire inlet that communicates with a space in which a heating module is disposed. An electric wire that connects the inside of the handle to the heating module may be disposed to sequentially pass through the electric wire outlet, the heat insulation space, and the electric wire inlet.

The handle may be provided with an operation portion configured to control operation of the heating module and a display configured to display a temperature of water. The heating module may be disposed inside of the inner body, and a bottom cover forming the lower surface of the body may be accommodated in a base. Side surfaces of the outer body and the base may be continuously disposed on a same plane and may be made of a same metal material.

Embodiments disclosed herein provide an electric kettle that may include a body made of stainless steel and having a cylindrical shape with an open upper surface and an open lower surface; a heating module configured to form a bottom of a space in which fluid, such as water may be contained inside of the body and heat the fluid; a handle that protrudes from an upper portion of an outer surface of the body; and a base configured to support the body at a lower side and supply power to the heating module in a state in which the body is seated. The body may include an outer body configured to form the outer surface of the body; an inner body connected to the outer body inside of the outer body and configured to form a space in which fluid may be contained; a heat insulation space between the outer body and the inner body; and at least one body hole open in the lower surface of the body and configured to communicate with the heat insulation space.

The at least one body hole may include a plurality of body holes. The plurality of body holes may be arranged along a circumference of the lower surface of the body at regular intervals. The at least one body hole may be formed in a lower surface of the heat insulation space. An upper end and a lower end of the inner body and the outer body may be connected to each other, and the at least one body hole may be formed in the lower end of the outer body.

An inner lower end portion that extends further downward than a lower end of the outer body may be formed at a lower end of the inner body, an outer lower end portion bent toward an outer surface of the inner body and connected to the outer body may be formed at the lower end of the outer body, and the at least one body hole may be formed along the outer lower end portion. The at least one body hole may be formed by cutting away an end of the outer lower end portion.

A mounting portion recessed outward and supporting a circumference of the heating module may be formed at an upper end of the inner lower end portion, and the outer lower end portion may extend to be in contact with an edge at which a lower end of the mounting portion and the upper end of the inner lower end portion are in contact with each other. A handle that protrudes outward from the body may be provided on the outer surface of the body, and a printed circuit board (PCB) configured to control the heating module may be provided inside of the handle.

An electric wire outlet that communicates with an inside of the handle may be formed in the outer body, an electric wire inlet that communicates a space in which the heating module is disposed may be formed in the inner body, and an electric wire that connects the PCB to the heating module may sequentially pass through the electric wire outlet, the heat insulation space, and the electric wire inlet.

An upper body made of a metal material may extend along a circumference of an upper end of the body, and the handle may be mounted to protrude from an outer surface of the upper body. A body top opening may be formed at a lower end of the upper body corresponding to the electric wire outlet, and an open front surface of the handle may accommodate the body top opening.

The electric wire outlet may be formed at the upper end of the body in which the inner body and the outer body are connected to each other, a top opening open at a position corresponding to the electric wire outlet may be formed in the upper body, and the handle may be mounted to cover the top opening. An inner upper end portion and an outer upper end portion bent to be connected in surface contact with each other and extending upward may be formed at upper ends of the inner body and the outer body, and the inner upper end portion and the outer upper end portion may be inserted into the upper body in a state of being connected to each other.

A bottom cover may be connected to the inner lower end portion to cover an open lower surface of the inner body, and a circumference of the bottom cover may cover the at least one body hole.

A rim that extends upward may be formed along a circumference of the base. The outer lower end portion may be supported to the rim. The bottom cover may be accommodated in the rim.

A lower end of the outer body may be bent toward an outer surface of the inner body, and the at least one body hole may be open along the outer lower end portion. A bottom cover may be mounted on the lower end of the inner body to cover the heating module and form a bottom surface of the body. The bottom cover may cover the at least one body hole.

The bottom cover may be mounted on the lower surface of the body. The lower end of the inner body may be inserted into the bottom cover. The lower end of the outer body may be supported to an upper end of the bottom cover.

The body may be subjected to electropolishing.

The inner body may extend further downward than the outer body, and the lower end of the outer body may extend inward from the inner body. At least a portion of the lower end of the outer body may be spaced apart from an outer surface of the inner body.

The details of one or more embodiments are set forth in the accompanying drawings and the description. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric kettle, comprising:
   a body made of stainless steel and having a cylindrical shape with an open upper surface and an open lower surface;
   a heating module configured to form a bottom of a space in which fluid is contained inside of the body and heat the fluid;
   a handle that protrudes from an upper portion of an outer surface of the body; and
   a base configured to support the body at a lower side and supply power to the heating module in a state in which the body is seated, wherein the body comprises:
      an outer body configured to form the outer surface of the body;
      an inner body connected to the outer body inside of the outer body and configured to form the space in which fluid is contained;
      a heat insulation space formed between the outer body and the inner body; and
      at least one body hole opened in a lower surface of the body and configured to communicate with the heat insulation space.

2. The electric kettle according to claim 1, wherein the at least one body hole comprises a plurality of body holes, and wherein the plurality of body holes is arranged along a circumference of the lower surface of the body at regular intervals.

3. The electric kettle according to claim 1, wherein the at least one body hole is formed at a lower portion of the heat insulation space.

4. The electric kettle according to claim 1, wherein upper ends and lower ends of the inner body and the outer body are connected to each other, and wherein the at least one body hole is formed at the lower end of the outer body.

5. The electric kettle according to claim 1, wherein an inner lower end portion extending further downward than a lower end of the outer body is formed at a lower end of the inner body, wherein an outer lower end portion bent toward an outer surface of the inner body and connected to the outer body is formed at the lower end of the outer body, and wherein the at least one body hole is formed in the outer lower end portion.

6. The electric kettle according to claim 5, wherein the at least one body hole is formed by cutting away an end of the outer lower end portion.

7. The electric kettle according to claim 5, wherein a mounting portion recessed outward and supporting a circumference of the heating module is formed at an upper end of the inner lower end portion, and wherein the outer lower end portion extends to be in contact with an edge at which a lower end of the mounting portion and the upper end of the inner lower end portion are in contact with each other.

8. The electric kettle according to claim 5, wherein a bottom cover is connected to the inner lower end portion to cover an open lower surface of the inner body, and wherein a circumference of the bottom cover covers the at least one body hole.

9. The electric kettle according to claim 8, wherein a rim that extends upward is formed along a circumference of the base, and wherein the outer lower end portion is supported by the rim, and the bottom cover is accommodated in the rim.

10. The electric kettle according to claim 1, wherein a printed circuit board (PCB) configured to control the heating module is provided inside of the handle.

11. The electric kettle according to claim 10, wherein an electric wire outlet that communicates with an inside of the handle is formed in the outer body, wherein an electric wire inlet that communicates with a space in which the heating module is disposed is formed in the inner body, and wherein an electric wire that connects the PCB to the heating module sequentially passes through the electric wire outlet, the heat insulation space, and the electric wire inlet.

12. The electric kettle according to claim 11, wherein the body further comprises an upper body at an upper end of the body, and wherein the handle protrudes from an outer surface of the upper body.

13. The electric kettle according to claim 12, wherein a body top opening is formed at a lower end of the upper body corresponding to the electric wire outlet, and wherein an open front surface of the handle accommodates the body top opening.

14. The electric kettle according to claim 12, wherein the electric wire outlet is formed at the upper end of the body at which the inner body and the outer body are connected to each other, wherein a top opening opened at a position corresponding to the electric wire outlet is formed in the upper body, and wherein the handle is mounted to cover the top opening.

15. The electric kettle according to claim 12, wherein an inner upper end portion and an outer upper end portion bent to be connected in surface contact with each other and extending upward are formed at upper ends of the inner body and the outer body, and wherein the inner upper end portion and the outer upper end portion are inserted into the upper body in a state of being connected to each other.

16. The electric kettle according to claim 1, wherein a lower end of the outer body is bent toward an outer surface of the inner body, and wherein the at least one body hole is open along the outer lower end portion.

17. The electric kettle according to claim 16, wherein a bottom cover is mounted on the lower end of the inner body to cover the heating module and form a bottom surface of the body, and wherein the bottom cover covers the at least one body hole.

18. The electric kettle according to claim 17, wherein the bottom cover is mounted on the lower surface of the body, and wherein the lower end of the inner body is inserted into the bottom cover, and the lower end of the outer body is supported by an upper end of the bottom cover.

19. The electric kettle according to claim 1, wherein the body is subjected to electropolishing.

20. The electric kettle according to claim 1, wherein the inner body extends further downward than the outer body, and wherein a lower end of the outer body extends inward from the inner body, and at least a portion of the lower end of the outer body is spaced apart from an outer surface of the inner body.

21. An electric kettle, comprising:
a body having an open upper surface and an open lower surface;
a heater provided at a bottom of a space in which fluid is contained inside of the body and configured to heat the fluid;
a handle that protrudes from an upper portion of an outer surface of the body; and
a base configured to support the body at a lower side and supply power to the heater in a state in which the body is seated, wherein the body comprises:
an outer body configured to form the outer surface of the body;
an inner body connected to the outer body inside of the outer body and configured to form the space in which fluid is contained; and
a heat insulation space formed between the outer body and the inner body; and
a plurality of body holes arranged along a circumference of a lower surface of the body at regular intervals.

22. The electric kettle according to claim 21, wherein the body is subjected to electropolishing and electrolytes are discharged from the heat insulation space through the plurality of body holes.

23. The electric kettle according to claim 22, wherein an inner lower end portion extending further downward than a lower end of the outer body is formed at a lower end of the inner body, wherein an outer lower end portion bent toward an outer surface of the inner body and connected to the outer body is formed at the lower end of the outer body, and wherein the plurality of body holes is formed by cutting away an end of the outer lower end portion.

* * * * *